(12) United States Patent
Takahashi et al.

(10) Patent No.: US 9,841,844 B2
(45) Date of Patent: Dec. 12, 2017

(54) IMAGE DISPLAY DEVICE

(71) Applicant: Funai Electric Co., Ltd., Daito, Osaka (JP)

(72) Inventors: Kazuhiro Takahashi, Osaka (JP); Atsuhiko Chikaoka, Kyoto (JP); Ken Nishioka, Kawachinagano (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 260 days.

(21) Appl. No.: 14/743,247

(22) Filed: Jun. 18, 2015

(65) Prior Publication Data

US 2015/0370415 A1 Dec. 24, 2015

(30) Foreign Application Priority Data

Jun. 20, 2014 (JP) .................................. 2014-126846
Jun. 20, 2014 (JP) .................................. 2014-126922

(51) Int. Cl.
*G06F 3/042* (2006.01)
*G06F 3/041* (2006.01)
*G02B 27/22* (2006.01)

(52) U.S. Cl.
CPC ....... *G06F 3/0421* (2013.01); *G02B 27/2292* (2013.01); *G06F 3/042* (2013.01); *G06F 3/0412* (2013.01); *G06F 2203/04101* (2013.01)

(58) Field of Classification Search
CPC ....... G02B 27/2292; G06F 2203/04101; G06F 3/0412; G06F 3/042; G06F 3/0421
See application file for complete search history.

(56) References Cited

U.S. PATENT DOCUMENTS 5,204,666 A * 4/1993 Aoki ..................... B60K 37/02
340/980
5,565,894 A * 10/1996 Bates .................... G06F 3/0418
345/173

(Continued)

FOREIGN PATENT DOCUMENTS

EP          2615523 A1   7/2013
JP       2011-027707 A   2/2011

(Continued)

OTHER PUBLICATIONS

Extended European Search Report of the corresponding European Application No. 15172970.4, dated Nov. 6, 2015.

*Primary Examiner* — Patrick Edouard
*Assistant Examiner* — Peijie Shen
(74) *Attorney, Agent, or Firm* — Global IP Counselors, LLP

(57) ABSTRACT

An image display device includes an image display component, a projection component that forms an optical image corresponding to an image displayed by the image display component, a distance measurement component having a detector that detects an indicator for performing an touch operation relative to the optical image to acquire distance information from the detector to the indicator, and a controller that determines whether or not the indicator has performed the touch operation relative to the optical image based on the distance information and relative movement information between the distance measurement component and at least one of the image display component and the projection component.

19 Claims, 18 Drawing Sheets

(56) References Cited

U.S. PATENT DOCUMENTS

| | | | | |
|---|---|---|---|---|
| 5,768,386 A * | 6/1998 | Yokomoto | G06F 21/83 | 345/173 |
| 8,432,377 B2 * | 4/2013 | Newton | G06F 3/0421 | 178/18.09 |
| 9,041,691 B1 * | 5/2015 | Haskin | G06F 3/0421 | 345/175 |
| 9,046,999 B1 * | 6/2015 | Teller | G02B 27/017 | |
| 2002/0041327 A1 * | 4/2002 | Hildreth | G06F 3/011 | 348/42 |
| 2004/0242988 A1 * | 12/2004 | Niwa | A61B 6/467 | 600/407 |
| 2004/0254699 A1 * | 12/2004 | Inomae | B60K 37/02 | 701/36 |
| 2005/0122584 A1 * | 6/2005 | Ishikawa | G06F 3/0346 | 359/463 |
| 2005/0264559 A1 * | 12/2005 | Vesely | G02B 27/2221 | 345/419 |
| 2007/0188022 A1 * | 8/2007 | Itabashi | G02B 27/0093 | 307/9.1 |
| 2008/0018591 A1 * | 1/2008 | Pittel | G06F 1/1616 | 345/156 |
| 2010/0066676 A1 * | 3/2010 | Kramer | G06F 3/017 | 345/158 |
| 2010/0110384 A1 * | 5/2010 | Maekawa | G02B 5/124 | 353/10 |
| 2010/0245345 A1 * | 9/2010 | Tomisawa | G02B 3/0062 | 345/419 |
| 2010/0302173 A1 * | 12/2010 | Deng | G06F 3/0412 | 345/173 |
| 2011/0096011 A1 * | 4/2011 | Suzuki | G06F 3/0418 | 345/173 |
| 2011/0141009 A1 * | 6/2011 | Izumi | A63F 13/04 | 345/156 |
| 2011/0187706 A1 * | 8/2011 | Vesely | G06T 15/00 | 345/419 |
| 2011/0285965 A1 * | 11/2011 | Sugiyama | G03B 21/28 | 353/10 |
| 2012/0056989 A1 * | 3/2012 | Izumi | H04N 13/0014 | 348/46 |
| 2012/0113104 A1 * | 5/2012 | Jung | G02B 27/2292 | 345/419 |
| 2012/0229377 A1 * | 9/2012 | Kim | G06F 3/017 | 345/157 |
| 2012/0236269 A1 * | 9/2012 | Yoneno | H04N 13/0402 | 353/99 |
| 2014/0253880 A1 * | 9/2014 | Yoneno | G03B 21/28 | 353/10 |
| 2014/0327747 A1 * | 11/2014 | Kong | G02B 27/2292 | 348/51 |
| 2015/0070319 A1 * | 3/2015 | Pryor | G06F 3/0425 | 345/175 |
| 2015/0077399 A1 * | 3/2015 | Nishioka | G06F 3/0421 | 345/175 |
| 2015/0100254 A1 * | 4/2015 | Chen | G06F 3/0418 | 702/58 |
| 2015/0116837 A1 * | 4/2015 | Yamada | B60K 35/00 | 359/632 |
| 2015/0248174 A1 * | 9/2015 | Ano | G06F 3/0325 | 345/156 |
| 2015/0301347 A1 * | 10/2015 | Juni | H04N 13/04 | 353/10 |
| 2016/0005219 A1 * | 1/2016 | Powell | G06F 3/0425 | 345/426 |
| 2016/0295185 A1 * | 10/2016 | Mima | G09G 5/36 | |
| 2017/0090420 A1 * | 3/2017 | Rotschild | G03H 1/2205 | |

FOREIGN PATENT DOCUMENTS

| | | | |
|---|---|---|---|
| JP | 2013-205885 A | | 10/2013 |
| JP | 2013205885 A | * | 10/2013 |
| WO | 2013161498 A1 | | 10/2013 |
| WO | 2014084034 A1 | | 6/2014 |

* cited by examiner

IMAGE DISPLAY DEVICE

CROSS-REFERENCE TO RELATED APPLICATIONS

This application claims priority to Japanese Patent Application Nos. 2014-126922 filed on Jun. 20, 2014 and 2014-126846 filed on Jun. 20, 2014. The entire disclosures of Japanese Patent Application Nos. 2014-126922 and 2014-126846 are hereby incorporated herein by reference.

BACKGROUND

Field of the Invention

This invention generally relates to an image display device. More specifically, the present invention relates to an image display device having a distance measurement component for acquiring distance information to an indicator.

Background Information

Generally, an image display device comprising a distance measurement component that acquires distance information to an indicator is known in the art (see Japanese Laid-Open Patent Application Publication No. 2011-27707 (Patent Literature 1), for example).

The above-mentioned Patent Literature 1 discloses a game device comprising a time-of-flight type of distance image sensor for acquiring distance information from a light emitter to a person (an indicator). This game device is provided with a household television set, the time-of-flight distance image sensor, and an application processor. The application processor acquires distance information from the time-of-flight distance image sensor, and calculates, based on the acquired distance information, operation information indicating the amount of change and the direction of change in the distance between the game device (light emitter) and the person (indicator). The application processor is configured to perform control so that the calculated operation information is reflected in the content displayed on the household television set (image display component).

Also, an image display devices is also known that comprises an imaging component in which the light of an image from an image display component is incident from one side, and which forms the incident image light into an optical image in the air on the other side.

SUMMARY

It has been discovered that, with an image display device comprising an image display component and an imaging component, when distance information from the image display device to the indicator is acquired, a time-of-flight distance image sensor for acquiring distance information from the image display device of the above-mentioned Patent Literature 1 to the indicator can be applied to a conventional image display device. In this case, a configuration is possible in which the time-of-flight distance image sensor is disposed in the image display device, and distance information from the image display device to the indicator (such as the user's finger) is acquired by the time-of-flight distance image sensor (distance measurement component). Also, a configuration is possible in which there is provided a controller that determines whether or not an indicator has performed a touch operation based on the position used to determine whether or not the indicator has performed a touch operation, and the position of the indicator (the distance information acquired by the distance measurement component), using the position of the optical image when a touch operation is performed with the indicator as the position used to determine whether or not the indicator has performed a touch operation (virtual touch screen).

In general, the optical image formed in a space has a narrow range of visibility, so only users of a certain height (eye position) can see the entire optical image. Accordingly, the position where the optical image is formed has to be moved to match the height of the user. When this is done, however, a problem is that moving the position where the optical image is formed will sometimes prevent the system from properly determined whether or not the indicator has touched the optical image.

One aspect is to provide an image display device with which it is possible to properly decide whether or not an indicator has touched an optical image even when the position where the optical image is formed has moved.

In view of the state of the known technology, an image display device is provided that includes an image display component, a projection component that forms an optical image corresponding to an image displayed by the image display component, a distance measurement component having a detector that detects an indicator for performing an touch operation relative to the optical image to acquire distance information from the detector to the indicator, and a controller that determines whether or not the indicator has performed the touch operation relative to the optical image based on the distance information and relative movement information between the distance measurement component and at least one of the image display component and the projection component.

Also other objects, features, aspects and advantages of the present disclosure will become apparent to those skilled in the art from the following detailed description, which, taken in conjunction with the annexed drawings, discloses one embodiment of the image display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

The configuration of an image display device 100 in accordance with a first embodiment will be described through reference to FIGS. 1 to 4.

Figure 1:
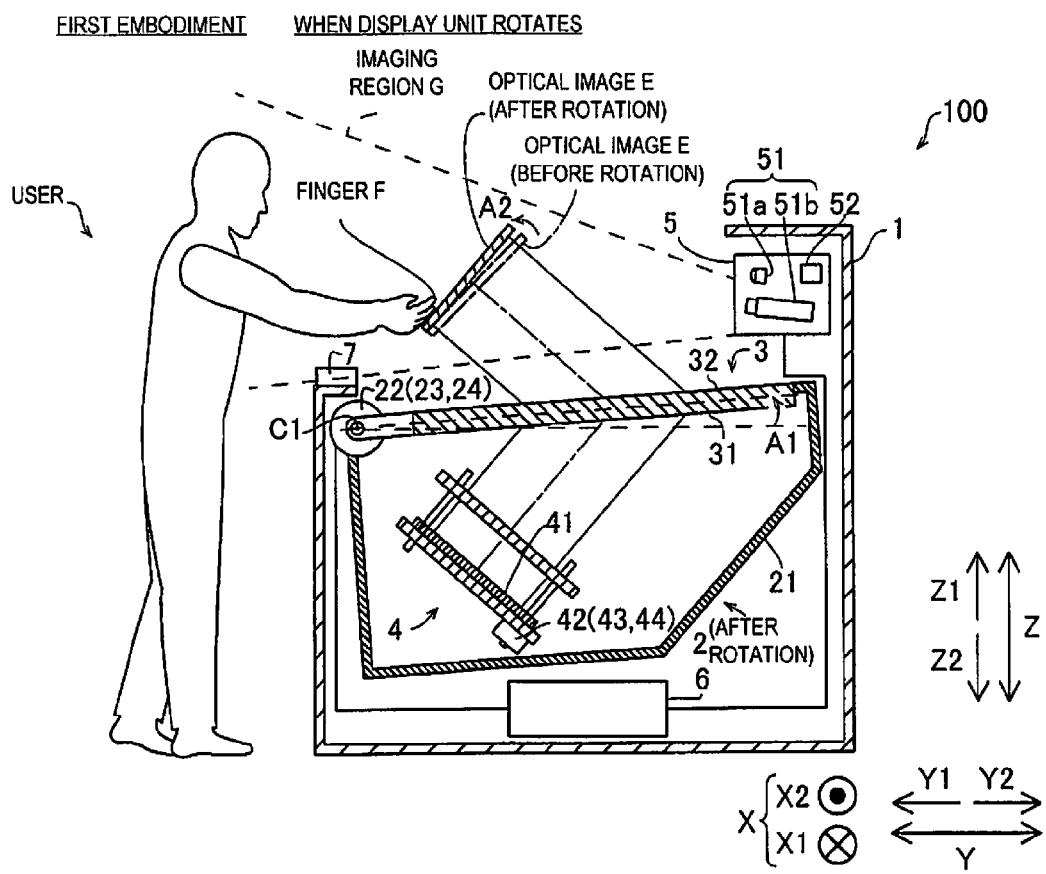
FIG. 1 is a cross sectional view of the overall configuration of an image display device in accordance with a first embodiment.

As shown in FIG. 1, with the image display device 100 in accordance with the first embodiment, an image display device main body 1 is installed on the ground (a floor, etc.).

A display unit 2 is provided to the image display device 100. The display unit 2 includes a display unit housing 21 and a rotation mechanism 22. The display unit housing 21 is disposed inside the image display device main body 1. The rotation mechanism 22 is attached to the image display device main body 1 and is configured to be able to rotate the display unit housing 21.

A reflecting element aggregate board 3 is provided to the image display device 100. The reflecting element aggregate board 3 is formed in a flat shape. The reflecting element aggregate board 3 is disposed on the upper side of the display unit housing 21 (the arrow Z1 direction side), and is attached to the rotation mechanism 22 on the arrow Y1 direction side of the display unit housing 21. The reflecting element aggregate board 3 is an example of the "projection component or imaging component" of the present invention. In the illustrated embodiment, the reflecting element aggregate board 3 includes a dihedral corner reflector array, for example. However, the reflecting element aggregate board 3 can be formed by any other optical element that forms an optical image in midair corresponding to an image of an image display component 4.

The image display component 4 is also provided to the image display device 100. The image display component 4 is disposed inside the display unit housing 21.

A distance measurement component 5 is also provided to the image display device 100. The distance measurement component 5 is disposed on the upper side of the display unit 2 (the arrow Z1 direction side), and is attached to the image display device main body 1.

A main body-side controller 6 is also provided to the image display device 100. The main body-side controller 6 is disposed inside the image display device main body 1, and is connected to the display unit 2 and the distance measurement component 5. The main body-side controller 6 is an example of the "controller" of the present invention.

A manipulation component 7 is also provided to the image display device 100. The manipulation component 7 is attached on the upper face of the image display device main body 1 (the face on the arrow Z1 direction side), and on the arrow Y1 direction side (the side where the user is located). The manipulation component 7 is configured to be able to accept manipulation from the user. More specifically, the manipulation component 7 is equipped with a plurality of buttons (not shown). The manipulation component 7 is connected to the main body-side controller 6, and is configured so that the result of pressing the buttons by the user will be transmitted to the main body-side controller 6.

As shown in FIG. 1, in the first embodiment, the reflecting element aggregate board 3 is configured to be able to rotate integrally with the display unit housing 21 around a rotational axis C1 that lies in the same plane as the reflecting element aggregate board 3.

More specifically, a rotation driver 23 is provided near the rotation mechanism 22 to which the reflecting element aggregate board 3 is attached. The rotation driver 23 is constituted by a motor with a rotational axle or the like, and is configured to rotate the rotation mechanism 22 around the rotational axis C1, which lies in the same plane as the reflecting element aggregate board 3, in the arrow A1 direction (or the opposite direction from the arrow A1 direction) in the YZ plane, based on an instruction from the main body-side controller 6. When the rotation mechanism 22 rotates in the arrow A1 direction, the reflecting element aggregate board 3 attached to the rotation mechanism 22 is configured to rotate in the arrow A1 direction (integrally with the display unit housing 21).

A rotational displacement sensor 24 is provided near the rotation mechanism 22. The rotational displacement sensor 24 includes a rotary encoder or the like, and is configured to be able to acquire information about the rotational angle at which the rotation mechanism 22 is rotated by the rotation driver 23. The rotational displacement sensor 24 is connected to the main body-side controller 6, and is configured to transmit information about the acquired rotational angle of the rotation mechanism 22 to the main body-side controller 6. This information about the rotational angle is an example of the "movement information" of the present invention.

Figure 2:
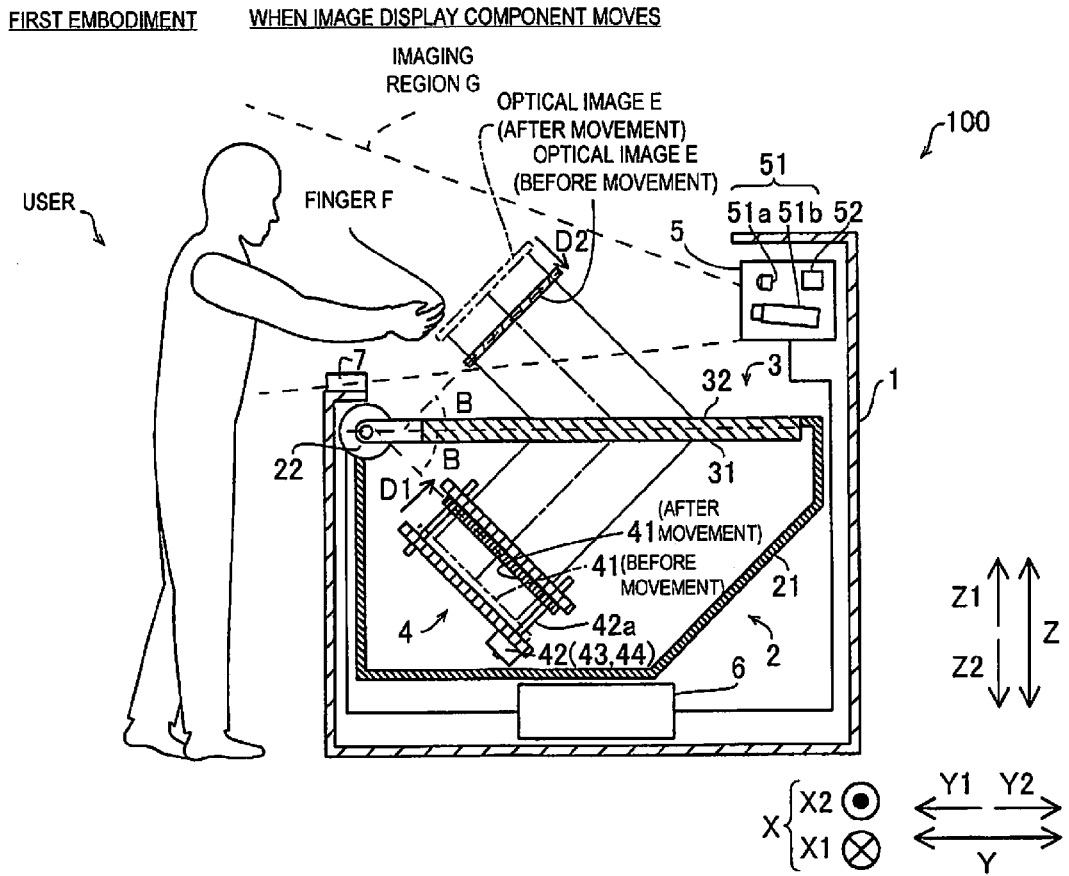
FIG. 2 is a cross sectional view of the overall configuration of the image display device in accordance with the first embodiment.

As shown in FIG. 2, in the first embodiment, the image display component 4 is disposed so as to have an inclination angle B with respect to the reflecting element aggregate board 3, and is configured to be able to move with respect to the reflecting element aggregate board 3 while maintaining the inclination angle B.

More specifically, a liquid crystal panel 41 is provided to the image display component 4. The liquid crystal panel 41 is disposed on the lower side of the reflecting element aggregate board 3 (the arrow Z2 direction side), and is disposed so as to have the inclination angle B with respect to the reflecting element aggregate board 3. The liquid crystal panel 41 is also configured to display an image, and is disposed so as to emit the light of the image toward the bottom face 31 of the reflecting element aggregate board 3. The bottom face 31 is an example of the "one side" in the present invention.

A linear motion mechanism 42 and a linear motion driver 43 are provided to the image display component 4. The linear motion mechanism 42 supports the liquid crystal panel 41 and is attached to the display unit housing 21. The linear motion driver 43 is constituted by a motor or the like, and is configured to drive based on an instruction from the main body-side controller 6. The linear motion driver 43 is connected to the linear motion mechanism 42, and is configured to move the liquid crystal panel 41 attached to the linear motion mechanism 42 in the arrow D1 direction while maintaining the inclination angle B when driven by the linear motion driver 43.

More specifically, the liquid crystal panel 41 is provided with a hole (not shown) that allows a shaft 42a having trapezoidal threads of the linear motion mechanism 42 to pass through and mesh. When the shaft 42a is drive around its axis by the linear motion driver 43, the liquid crystal panel 41 is moved in the arrow D1 direction. Specifically, the linear motion mechanism 42 and the linear motion driver 43 are configured to be driven as linear actuators.

Also, a linear motion displacement detector 44 is provided near the linear motion mechanism 42. The linear motion displacement detector 44 is configured to acquire information about the movement distance the linear motion mechanism 42 has been moved by the linear motion driver 43. Specifically, information about the movement distance the linear motion mechanism 42 has been moved is expressed as information about the relative movement between the image display component 4 and the reflecting element aggregate board 3. The linear motion displacement detector 44 is connected to the main body-side controller 6, and is configured to transmit the acquired information about the movement distance of the linear motion mechanism 42 to the main body-side controller 6. This information about the movement distance is an example of the "movement information" of the present invention.

As shown in FIG. 2, in the first embodiment, the reflecting element aggregate board 3 is configured so that light of the image displayed by the liquid crystal panel 41 is incident from the bottom face 31, and the incident image light is formed as an optical image E corresponding to an image incident in the air on the top face 32 side (the arrow Z1 direction side). The optical image E, as discussed below, is configured as a virtual touch screen that accepts virtual touch operations from the user by means of the distance measurement component 5, the main body-side controller 6, etc. The top face 32 is an example of the "other side" in the present invention.

More specifically, the reflecting element aggregate board 3 is formed in a flat shape, parallel to the XY plane. The reflecting element aggregate board 3 has holes (not shown) formed in it, which pass through from the top face 32 to the bottom face 31, and the inner walls of these holes have a mirror finish. With the reflecting element aggregate board 3, light that is incident on these through-holes from the liquid crystal panel 41 is reflected by the mirror surfaces, and changes the direction in which it is moving while passing from the bottom face 31 to the top face 32 of the reflecting element aggregate board 3. The reflecting element aggregate board 3 is configured to form the light emitted from the top face 32 side into the optical image E corresponding to the image of the liquid crystal panel 41, at a position that is in plane symmetry with the liquid crystal panel 41, with respect to the reflecting element aggregate board 3. Specifically, the reflecting element aggregate board 3 is configured to form the optical image E on a face having an inclination angle equal to the inclination angle B, on the top face 32 side (the arrow Z1 direction side).

As shown in FIG. 1, in the first embodiment, the distance measurement component 5 is provided with a detector 51 and a distance measurement component controller 52. The detector 51 includes an infrared light source 51a that emits light, and a CCD (charge coupled device) camera 51b that receives light emitted from the infrared light source 51a and reflected by an indicator (finger F). The infrared light source 51a is an example of the "light emitter" of the present invention. The CCD camera 51b is an example of the "light receiver" of the present invention.

Figure 4:
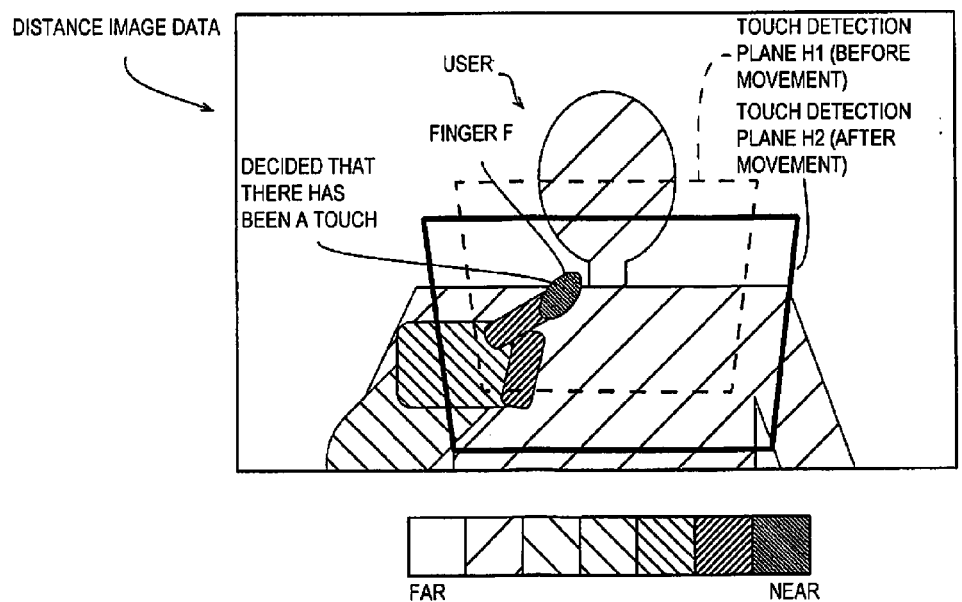
FIG. 4 is a diagram illustrating distance screen data and a touch detection plane in accordance with the first embodiment.

As shown in FIG. 4, in the first embodiment, the distance measurement component controller 52 is configured to acquire distance image data about the distance from the detector 51 to the finger F based on the elapsed time from the point when the infrared light source 51a emits light until the point when the CCD camera 51b receives the light emitted from the infrared light source 51a and reflected by the indicator (finger F). The distance measurement component controller 52 is connected to the main body-side controller 6, and is configured to transmit the acquired distance image data to the main body-side controller 6. The distance image data is an example of the "distance information" of the present invention.

More specifically, as shown in FIG. 1, the infrared light source 51a is configured to emit infrared light on the upper side of the display unit 2 (the arrow Z1 direction side) and toward the user (in the arrow Y1 direction), based on an instruction from the distance measurement component controller 52.

Figure 3:
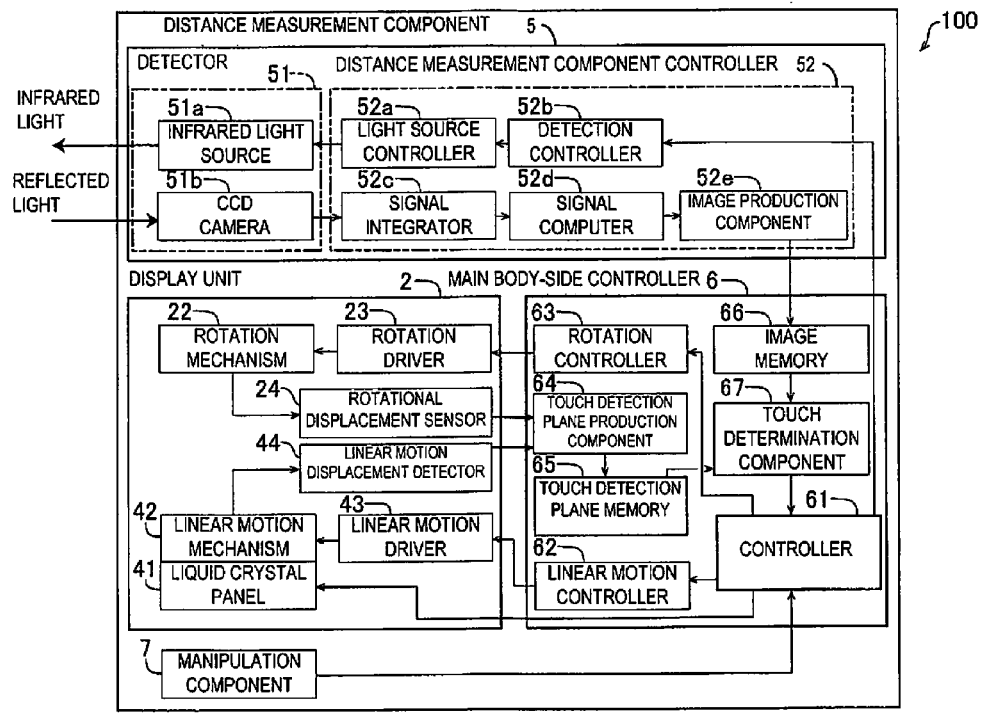
FIG. 3 is a block diagram of the overall configuration of the image display device in accordance with the first embodiment.

As shown in FIG. 3, the distance measurement component controller 52 is provided with a light source controller 52a and a detection controller 52b. The detection controller 52b is configured to acquire a control signal from the main body-side controller 6, and is configured to transmit the acquired control signal to the light source controller 52a. The light source controller 52a is configured to drive the infrared light source 51a based on the transmitted control signal.

As shown in FIGS. 1 and 2, the CCD camera 51b is configured to be able to receive light that has been emitted from the infrared light source 51a and reflected. The CCD camera 51b is also configured to capture as an image the light that is emitted from the infrared light source 51a and reflected, in an imaging region G above the display unit 2 (the arrow Z1 direction side). The CCD camera 51b is also configured to transmit the acquired imaging data to the distance measurement component controller 52.

As shown in FIG. 3, the distance measurement component controller 52 is provided with a signal integrator 52c, a signal computer 52*d* and an image production component 52*e*. The signal integrator 52*c* is configured to acquire imaging data from the CCD camera 51*b* and integrate the imaging data. The signal computer 52*d* is configured to compute the distance from the distance measurement component 5 to the indicator (finger F) by acquiring the imaging data integrated by the signal integrator 52*c*, and information about the elapsed time from the point when the infrared light source 51*a* emits light until the point when light emitted from the infrared light source 51*a* and reflected by the indicator (finger F) or the like is received by the CCD camera 51*b*. The image production component 52*e* is configured to produce distance image data (see FIG. 4), which is data about a captured image having distance information, based on imaging data and the computed distance data. For example, the distance image data is configured to include distance data for each pixel of a two-dimensional image. The image production component 52*e* is connected to the main body-side controller 6, and is configured to transmit the produced distance image data to the main body-side controller 6.

In the illustrated embodiment, the distance measurement component controller 52 can include at least one microcomputer or processor. The distance measurement component controller 52 can also include other conventional components such as an input interface circuit, an output interface circuit, and storage devices such as a ROM (Read Only Memory) device and a RAM (Random Access Memory) device. The internal RAM stores statuses of operational flags and various control data. The internal ROM stores control programs for various operations. The distance measurement component controller 52 is capable of selectively controlling any of the components in accordance with the control program. It will be apparent to those skilled in the art from this disclosure that the precise structure and algorithms for the distance measurement component controller 52 can be any combination of hardware and software that will carry out the functions of the present invention. Specifically, the light source controller 52*a*, the detection controller 52*b*, the signal integrator 52*c*, the signal computer 52*d* and the image production component 52*e* can be any combination of hardware and software. In particular, the light source controller 52*a*, the detection controller 52*b*, the signal integrator 52*c*, the signal computer 52*d* and the image production component 52*e* can be a single processor or separate processors, or control programs that perform the functions of each components, respectively, on the processor of the distance measurement component controller 52.

As shown in FIG. 3, a controller 61 is provided to the main body-side controller 6. The controller 61 is configured to control the entire image display device 100. For example, the controller 61 is configured to control the output of the image displayed on the liquid crystal panel 41, to control the output of a control signal used for acquiring distance image data to the distance measurement component 5, and to control the acquisition of manipulation information from the manipulation component 7.

The manipulation information from the manipulation component 7 includes manipulation information indicating the direction and distance the image display component 4 has been moved by the user, manipulation information indicating the direction and distance the display unit 2 has been moved by the user, and so forth.

A linear motion controller 62 is also provided to the main body-side controller 6. The linear motion controller 62 is configured to transmit a control signal for moving the liquid crystal panel 41 to the linear motion driver 43 based on the manipulation information acquired by the controller 61.

A rotation controller 63 is also provided to the main body-side controller 6. The rotation controller 63 is configured to transmit a control signal for moving the display unit 2 to the rotation driver 23 based on manipulation information acquired by the controller 61.

A touch detection plane production component 64 is also provided to the main body-side controller 6. As shown in FIG. 4, the touch detection plane production component 64 is configured to produce a touch detection plane H1 (and a touch detection plane H2) by acquiring movement information from the rotational displacement sensor 24 and the linear motion displacement detector 44. More specifically, the touch detection plane H1 (and the touch detection plane H2) are virtual detection planes for the main body-side controller 6 to recognize a position corresponding to the optical image E formed on a plane having a specific distance from the detector 51, as the plane virtually touched by the user.

As shown in FIG. 3, a touch detection plane memory 65 is also provided to the main body-side controller 6. The touch detection plane memory 65 is configured to store information about the touch detection plane H1 (and the touch detection plane H2) produced by the touch detection plane production component 64.

An image memory 66 is also provided to the main body-side controller 6. The image memory 66 is configured to acquire distance image data from the distance measurement component 5, and store the acquired distance image data.

A touch determination component 67 is also provided to the main body-side controller 6. The touch determination component 67 is configured to read data about the touch detection plane H1 (and the touch detection plane H2) stored in the touch detection plane memory 65, and to read distance image data stored in the image memory 66. The touch determination component 67 is configured to determine whether or not the finger F has touched the optical image E by determining whether or not the finger F is disposed near the touch detection plane H1 (and the touch detection plane H2). Specifically, the touch determination component 67 is configured to determine that there has been a touch, and to transmit coordinate information about the touched position to the controller 61, if the finger F is disposed near the touch detection plane H1 (and the touch detection plane H2) (if it is within a specific range of distance from the touch detection plane H1 (and the touch detection plane H2)). On the other hand, the touch determination component 67 is configured to determine that there has been no touch, and to transmit to the controller 61 a signal indicating that there has been no touch, if the finger F is not disposed near the touch detection plane H1 (and the touch detection plane H2). Specifically, in the illustrated embodiment, the touch determination component 67 determines whether or not the finger F has touched the optical image E by determining whether or not the finger F is located at the touch detection plane H1 (or H2). For example, if the finger F is located on the touch detection plane H1 (or H2) or located closer to the distance measurement component 5 than the touch detection plane H1 (H2), then the touch determination component 67 determines that the finger F has touched the optical image E.

In the illustrated embodiment, the main body-side controller 6 can include at least one microcomputer or processor. The main body-side controller 6 can also include other conventional components such as an input interface circuit, an output interface circuit, and storage devices such as a ROM (Read Only Memory) device and a RAM (Random Access Memory) device. The internal RAM stores statuses of operational flags and various control data. The internal ROM stores control programs for various operations. The main body-side controller 6 is capable of selectively controlling any of the components in accordance with the control program. It will be apparent to those skilled in the art from this disclosure that the precise structure and algorithms for the main body-side controller 6 can be any combination of hardware and software that will carry out the functions of the present invention. Specifically, the controller 61, the rotation controller 63, the touch detection plane production component 64, the touch determination component 67 can be any combination of hardware and software. Specifically, the controller 61, the rotation controller 63, the touch detection plane production component 64, the touch determination component 67 can be a single processor or separate processors, or control programs that perform the functions of each components, respectively, on the processor of the main body-side controller 6. Also, the touch detection plane memory 65 and the image memory 66 can be a RAM device.

The controller 61 is configured to acquire coordinate information about the touched position from the touch determination component 67, or to acquire a signal indicating that there has been no touch.

Figure 5:
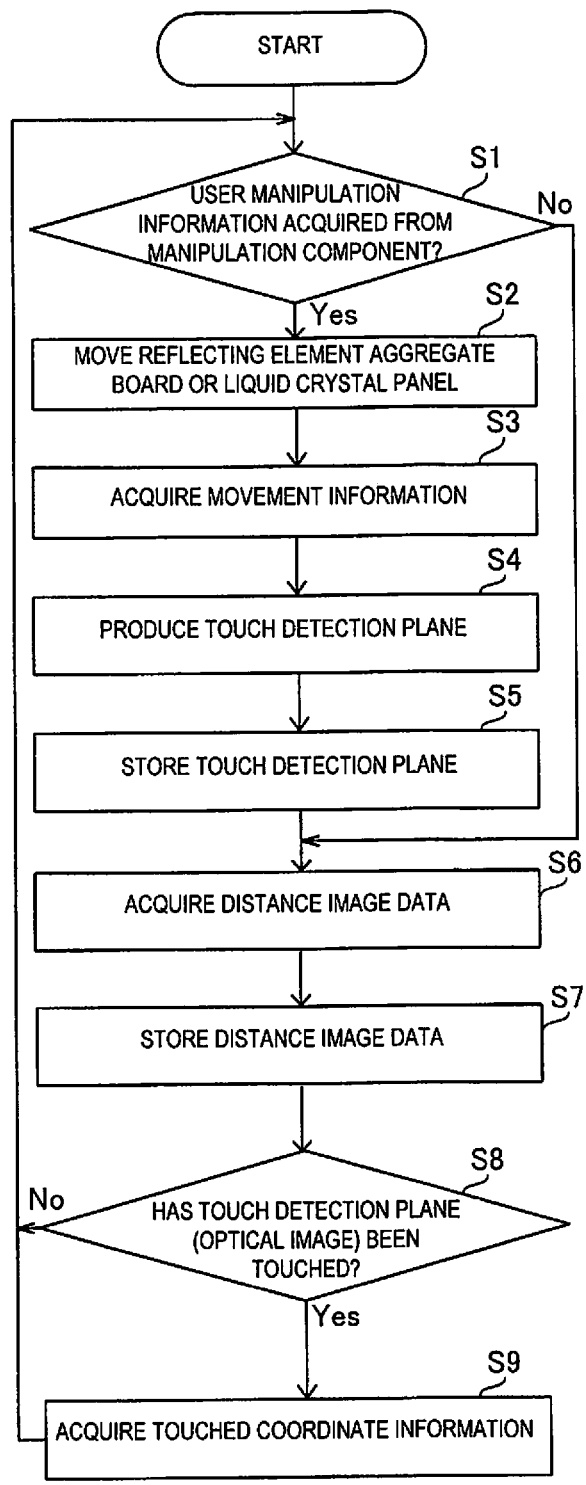
FIG. 5 is a flowchart illustrating a touch detection processing in accordance with the first embodiment.

The flow of touch detection processing performed with the image display device 100 in the first embodiment will now be described through reference to FIG. 5. The processing of the image display device 100 is performed by the main body-side controller 6.

In the first embodiment, whether or not the finger F has touched the optical image E is determined based on movement information about the image display component 4 that has moved while maintaining a predetermined inclination angle B with respect to the reflecting element aggregate board 3 (information about movement distance), rotation information about the reflecting element aggregate board 3 (the display unit 2) that has rotated around the rotational center C1 (rotational angle information), and distance information acquired by the distance measurement component 5 (distance image data). This will be described in specific terms below.

First, in step S1, it is determined whether or not user manipulation information has been acquired from the manipulation component 7. If user manipulation information has been acquired from the manipulation component 7, the flow proceeds to step S2, but if user manipulation information has not been acquired from the manipulation component 7, the flow proceeds to step S6.

In step S2, movement of the reflecting element aggregate board 3 or the liquid crystal panel 41 is performed. Specifically, in step S1, the rotation driver 23 or the linear motion driver 43 is driven based on user manipulation information acquired from the manipulation component 7, and rotation of the reflecting element aggregate board 3 (rotation of the display unit 2; see FIG. 1) or movement of the liquid crystal panel 41 (see FIG. 2) is performed.

As shown in FIG. 2, for example, the linear motion driver 43 is driven based on user manipulation information acquired from the manipulation component 7, and the liquid crystal panel 41 is moved in the arrow D1 direction. This movement of the liquid crystal panel 41 in the arrow D1 direction causes the optical image E to move in the arrow D2 direction. The flow then proceeds to step S3.

In step S3, movement information is acquired. Specifically, movement information about the liquid crystal panel 41 or the reflecting element aggregate board 3 moved in step S2 is acquired by the linear motion displacement detector 44 or the rotational displacement sensor 24, and the acquired movement information is transmitted to the touch detection plane production component 64. The flow then proceeds to step S4.

In step S4, a touch detection plane is produced. Specifically, the touch detection plane H2 (see FIG. 4) is produced by the touch detection plane production component 64 based on the movement information acquired in step S3.

As shown in FIGS. 2 and 4, for example, the touch detection plane H1 is produced before the liquid crystal panel 41 is moved in the arrow D1 direction (before the optical image E is moved in the arrow D2 direction). The touch detection plane H2 is produced after the liquid crystal panel 41 has been moved in the arrow D1 direction (after the optical image E has been moved in the arrow D2 direction). In this case, as shown in FIG. 4, the optical image E after movement is formed at a position closer to the distance measurement component 5 (on the arrow Y2 direction side) than the optical image E before movement, so the touch detection plane H2 is formed larger than the size of the touch detection plane H1. Also, since the optical image E after movement is formed below the optical image E prior to movement, the touch detection plane H2 is produced lower than the touch detection plane H1 (on the arrow Z2 direction side). And then, the process proceeds to Step S5.

In step S5, the touch detection plane is stored. Specifically, the touch detection plane H2 produced by the touch detection plane production component 64 is stored in the touch detection plane memory 65. The flow then proceeds to step S6.

The acquisition of distance image data from the distance measurement component 5 is performed in step S6 if no user manipulation information is acquired in step S1 or after step S5. The flow then proceeds to step S7.

In step S7, the distance image data is stored in the image memory 66. The flow then proceeds to step S8.

In step S8, it is determined whether or not the touch detection plane H2 (the optical image E) has been touched. Specifically, as shown in FIG. 4, the distance image data stored in the image memory 66 in step S7 is read, and the touch detection plane H2 stored in the touch detection plane memory 65 in step S5 is read, and the two are compared.

As shown in FIG. 4, for example, it is determined that the touch detection plane H2 (the optical image E) has been touched if the finger F (indicator) is near the touch detection plane H2 (the optical image E) in the distance image data (indicated by the portion in FIG. 4 with the smallest line spacing in the hatching). On the other hand, it is determined that the touch detection plane H2 (the optical image E) has not been touched if the finger F (indicator) is not near the touch detection plane H2 (the optical image E). In the example shown in FIG. 4, it is determined that a portion of the finger F (the portion with the smallest line spacing in the hatching) is touching, but it is determined that the rest of the finger F (the portion other than the portion with the smallest line spacing in the hatching) is not touching. If a part of the touch detection plane H2 (the optical image E) is being touched, the flow proceeds to step S9, and if none of the touch detection plane H2 (the optical image E) is being touched, the flow returns to step S1.

In step S9, information about the touched coordinates is acquired. For instance, in the example shown in FIG. 4, information is acquired about the coordinates of a portion of the finger F (the portion with the smallest line spacing in the hatching). In this case, information about the touched coordinates out of the touch detection plane H2 is acquired. The flow then proceeds to step S1. Specifically, in the illustrated embodiment, the information about the touched coordinates can be acquired from the distance image data and the touch detection plane H2. Specifically, as illustrated in FIG. 4, the position of the finger F relative to the touch detection plane H2 in the distance image data is acquired as the touched coordinates relative to the optical image E (the touch detection plane H2).

The following effects can be obtained with the first embodiment.

As discussed above, in the first embodiment, the main body-side controller 6 is configured to determine whether or not an indicator (the finger F) has touched the optical image E based on information about the relative movement between the distance measurement component 5 and the image display component 4 and/or the reflecting element aggregate board 3 (information about movement distance, information about rotational angle, and the touch detection plane H2), and distance information acquired by the distance measurement component 5 (distance image data). Consequently, even if the position where the optical image E is formed has moved, the position (the touch detection plane H1) for determining whether or not an indicator (the finger F) has touched the optical image E can be moved to a position (the touch detection plane H2) corresponding to the position where the optical image E is formed, based on movement information. As a result, even if the position where the optical image E is formed has moved, it can be properly determined whether or not the indicator (the finger F) has touched the optical image E.

Also, as discussed above, in the first embodiment the image display component 4 and the reflecting element aggregate board 3 are configured to be able to move relative to each other, and the main body-side controller 6 is configured to determine whether or not the indicator (the finger F) has touched the optical image E based on distance information (distance image data) and information about the relative movement of the image display component 4 and the reflecting element aggregate board 3 (information about the movement distance, and the touch detection plane H2). Consequently, the position of the optical image E can be moved without moving the entire image display device 100, so the image display device 100 (the rotation mechanism 22 and the linear motion mechanism 42) can be kept from becoming larger, while the optical image E can be moved to a height at which it is easier for the user to see.

Also, as discussed above, in the first embodiment the image display component 4 is disposed so as to have a predetermined inclination angle B with respect to the reflecting element aggregate board 3, and is configured to be able to move with respect to the reflecting element aggregate board 3 while maintaining the predetermined inclination angle B. Consequently, the main body-side controller 6 is configured to determine whether or not the indicator (the finger F) has touched the optical image E based on movement information about the image display component 4 that has moved while maintaining the predetermined inclination angle B relative to the reflecting element aggregate board 3 (information about movement distance, and the touch detection plane H2), and distance information (distance image data). This allows the distance between the user and the optical image E to be easily changed to a distance at which it is easier for the user to see.

Also, as discussed above, in the first embodiment the reflecting element aggregate board 3 is configured to be able to rotate around the rotational axis C1 that lies in the same plane as the reflecting element aggregate board 3. Also, the main body-side controller 6 is configured to determine whether or not the indicator (the finger F) has touched the optical image E based on rotation information about the reflecting element aggregate board 3 that has rotated around the rotational axis C1 that lies in the same plane as the reflecting element aggregate board 3 (information about rotational angle, and the touch detection plane H2), and distance information (distance image data). This allows the inclination angle of the optical image E to be easily changed to an angle at which it is easier for the user to see.

Also, as discussed above, in the first embodiment the detector 51 is provided with the infrared light source 51a that emits light, and the CCD camera 51b that receives light emitted from the infrared light source 51a and reflected by the indicator (the finger F). Also, the distance measurement component 5 is configured to acquire distance information from the detector 51 to the indicator (the finger F) based on the elapsed time from the point when the infrared light source 51a emits light until the point when the CCD camera 51b receives light emitted from the infrared light source 51a and reflected by the indicator (the finger F). Consequently, distance information from the detector 51 to the indicator (the finger F) (distance image data) can be easily acquired by measuring the elapsed time up to the point when the CCD camera 51b receives light emitted from the infrared light source 51a and reflected by the indicator (the finger F).

Thus, in the first embodiment, the image display device 100 comprises the display unit 2, the reflecting element aggregate board 3, the image display component 4, the distance measurement component 5 that acquires distance information indicating the distance to the indicator (finger F), and the main body-side controller 6 that determines whether or not the indicator (finger F) has touched the optical image E based on the distance information acquired by the distance measurement component 5 and information about relative movement between the distance measurement component 5 and the reflecting element aggregate board 3 and/or the image display component 4.

In the illustrated embodiment, both the reflecting element aggregate board 3 and the image display component 4 are movable as illustrated in FIGS. 1 and 2. However, the present invention is not limited to this. One of the reflecting element aggregate board 3 and the image display component 4 can be immovably and fixedly attached relative to the image display device main body 1.

In the illustrated embodiment, the image display device 100 is provided that comprises the display unit 2 having the image display component 4 and the reflecting element aggregate board 3 (e.g., the projection component) that is configured to form the optical image E corresponding to the image displayed by the image display component 4, with a position of the optical image E being changeable by relatively moving the image display component 4 and the reflecting element aggregate board 3 (e.g., the projection component), the distance measurement component 5 having the detector 51 that is configured to detect the finger F (e.g., the indicator) for performing the touch operation relative to the optical image E to acquire the distance image data (e.g., the distance information) from the detector 51 to the finger F (e.g., the indicator), and the main body-side controller 6 (e.g., the controller) configured to determine whether or not the finger F (e.g., the indicator) has performed the touch operation relative to the optical image E based on the distance image data (e.g., the distance information) and relative movement information between the distance measurement component 5 and at least one of the image display component 4 and the reflecting element aggregate board 3 (e.g., the projection component).

In the illustrated embodiment, the image display component 4 and the reflecting element aggregate board 3 (e.g., the projection component) are relatively movable with respect to each other, and the main body-side controller 6 (e.g., the controller) is configured to determine whether or not the finger F (e.g., the indicator) has performed the touch operation relative to the optical image E based on the the distance image data (e.g., the distance information) and relative movement information between the image display component 4 and the reflecting element aggregate board 3 (e.g., the projection component).

In the illustrated embodiment, the image display component 4 is arranged at a predetermined inclination angle with respect to the reflecting element aggregate board 3 (e.g., the projection component), and is movable with respect to the reflecting element aggregate board 3 (e.g., the projection component) while maintaining the predetermined inclination angle, and the main body-side controller 6 (e.g., the controller) is configured to determine whether or not the finger F (e.g., the indicator) has performed the touch operation relative to the optical image E based on the the distance image data (e.g., the distance information) and movement information of the image display component.

In the illustrated embodiment, the reflecting element aggregate board 3 (e.g., the projection component) is rotatable about the rotational axis C1, and the main body-side controller 6 (e.g., the controller) is configured to determine whether or not the finger F (e.g., the indicator) has performed the touch operation relative to the optical image E based on the the distance image data (e.g., the distance information) and rotation information of the reflecting element aggregate board 3 (e.g., the projection component).

In the illustrated embodiment, the distance measurement component 5 and at least one of the image display component 4 and the reflecting element aggregate board 3 (e.g., the projection component) are relatively movable with respect to each other.

In the illustrated embodiment, the detector 51 includes the infrared light source 51a (e.g., the light emitter) that is configured to emit light and the CCD camera 51b (e.g., the light receiver) that is configured to receive the light that has been emitted from the infrared light source 51a (e.g., the light emitter) and reflected by the finger F (e.g., the indicator) as reflected light, and the distance measurement component 5 is configured to acquire the the distance image data (e.g., the distance information) from the detector 51 to the finger F (e.g., the indicator) based on an elapsed time from a time point when the infrared light source 51a (e.g., the light emitter) emits the light until a time point when the CCD camera 51b (e.g., the light receiver) receives the reflected light.

In the illustrated embodiment, the detector 51 is configured to capture an image to produce the distance image data, and the main body-side controller 6 (e.g., the controller) is configured to define the touch detection plane H1 or H2 in the distance image data.

In the illustrated embodiment, the main body-side controller 6 (e.g., the controller) is configured to calculate or produce the touch detection plane H1 or H2 based on the relative movement information between the distance measurement component 5 and at least one of the image display component 4 and the reflecting element aggregate board 3 (e.g., the projection component), and the main body-side controller 6 (e.g., the controller) is configured to determine that the finger F (e.g., the indicator) has performed the touch operation relative to the optical image E upon determining that the finger F (e.g., the indicator) is located in a vicinity of the touch detection plane H1 or H2 based on the the distance image data (e.g., the distance information).

In the illustrated embodiment, the reflecting element aggregate board 3 (e.g., the projection component) is configured to receive light of the image displayed by the image display component 4 on one side thereof, and is configured to form the optical image E as a virtual touch screen on the other side thereof.

In the illustrated embodiment, the display unit 2 further has the display unit housing 21 (e.g., the housing) that supports the image display component 4 and the reflecting element aggregate board 3 (e.g., the projection component), and the image display component 4 is movable with respect to the display unit housing 21 (e.g., the housing).

In the illustrated embodiment, the reflecting element aggregate board 3 (e.g., the projection component) is fixedly supported by the display unit housing 21 (e.g., the housing).

Second Embodiment

Figure 6:
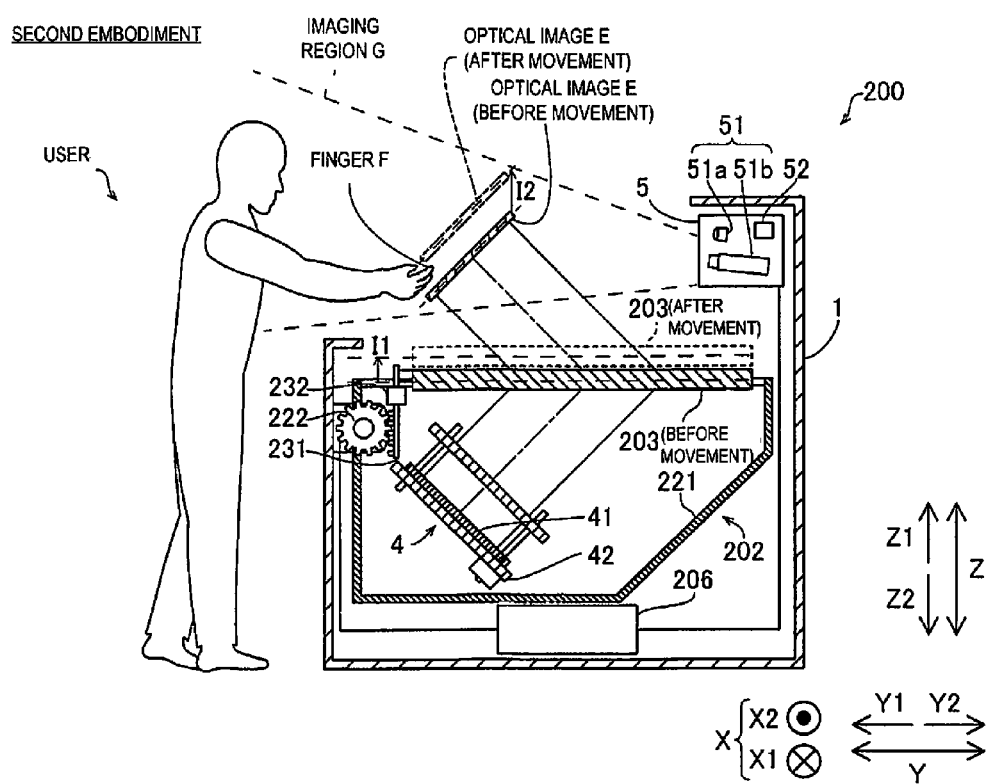
FIG. 6 is a cross sectional view of the overall configuration of an image display device in accordance with a second embodiment.
Figure 7:
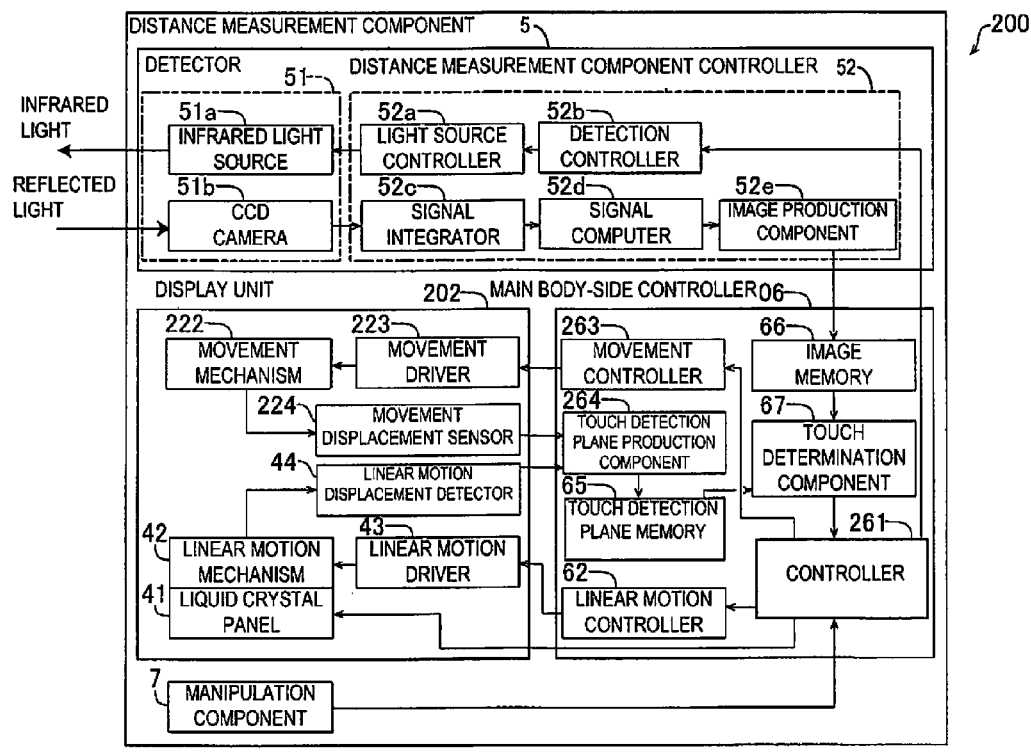
FIG. 7 is a block diagram of the overall configuration of the image display device in accordance with the second embodiment.

Referring now to FIGS. 6 and 7, an image display device 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The configuration of the image display device 200 in accordance with the second embodiment will now be described through reference to FIGS. 6 and 7. In this second embodiment, unlike the image display device 100 in the first embodiment, in which the display unit and the reflecting element aggregate board were configured to be able to rotate integrally, the reflecting element aggregate board is configured to be able to move in the up and down direction (the vertical direction).

As shown in FIGS. 6 and 7, a display unit 202 is provided to the image display device 200 in accordance with the second embodiment. The display unit 202 is fixed to the image display device main body 1, and includes a display unit housing 221, a movement mechanism 222, a movement driver 223 (see FIG. 7), and a movement displacement detector 224 (see FIG. 7). The movement mechanism 222 is constituted by a gear or the like, and the gear is disposed so as to mesh with teeth 231 on a reflecting element aggregate board 203 (discussed below). The movement driver 223 is constituted by a motor or the like, and is configured to rotate the gear of the movement mechanism 222 based on an instruction from a main body-side controller 206. The movement displacement detector 224 is configured to acquire information (movement information) about the rotational angle at which the movement driver 223 has rotated the movement mechanism 222.

As shown in FIG. 6, in the second embodiment, the reflecting element aggregate board 203 is disposed so as to be parallel to the horizontal plane (the XY plane), and is configured to be able to move in the up and down direction (the vertical direction; the Z direction).

The reflecting element aggregate board 203 is connected to the teeth 231 on the arrow Y1 direction side. The display unit 202 is provided with a fixed component 232 that is fixed to the display unit housing 221. The fixed component 232 is configured to be able to go through the teeth 231 in the Z direction. The teeth 231 mesh with the movement mechanism 222, and are configured so that when the movement mechanism 222 rotates, the teeth 231 move in the Z direction. The reflecting element aggregate board 203 is configured to move in the up and down direction (the Z direction) when the teeth 231 move in the Z direction.

As shown in FIG. 6, for example, when the reflecting element aggregate board 203 has moved to the arrow Z1 direction side by a movement distance I1 with respect to the image display component 4, since the optical image E is formed at a position that is in plane symmetry with the image display component 4, with respect to the reflecting element aggregate board 203, the position of the optical image E after movement is moved in the arrow Z1 direction by a movement distance I2 (twice the movement distance I1) from the position of the optical image E prior to movement.

As shown in FIG. 7, in the second embodiment, the main body-side controller 206 is configured to determine whether or not the indicator (the finger F) has touched the optical image E based on movement information about the reflecting element aggregate board 203 that has moved in the up and down direction (the vertical direction; the Z direction), and distance information (distance image data).

More specifically, as shown in FIG. 7, the main body-side controller 206 is provided with a controller 261, a movement controller 263, and a touch detection plane production component 264. The controller 261 is configured to acquire user manipulation information from the manipulation component 7, and transmit a control signal to the movement controller 263. The movement controller 263 is configured to control the operation of the movement driver 223 based on the control signal from the controller 261.

The touch detection plane production component 264 is configured to acquire movement information from the movement displacement detector 224 and the linear motion displacement detector 44, and to produce a touch detection plane based on the acquired movement information. The touch determination component 67 is configured to determine whether or not the indicator (the finger F) has touched the optical image E based on a comparison of the produced touch detection plane and the distance image data acquired from the distance measurement component 5. The distance image data and the method for comparing the produced touch detection plane with the distance image data acquired from the distance measurement component 5 in the second embodiment are the same as the distance image data and the method for comparing the produced touch detection plane with the distance image data acquired from the distance measurement component 5 in the first embodiment. Also, the rest of the configuration of the image display device 200 in accordance with the second embodiment is the same as that of the image display device 100 in the first embodiment.

The following effects can be obtained with the second embodiment.

With the second embodiment, as discussed above, the reflecting element aggregate board 203 is disposed so as to be parallel to the horizontal plane (the XY plane), and is configured to be able to move in the up and down direction (the vertical direction; the Z direction). Also, the main body-side controller 206 is configured to determine whether or not the indicator (the finger F) has touched the optical image E based on movement information about the reflecting element aggregate board 203 that has moved in the up and down direction (the vertical direction; the Z direction), and distance information (distance image data). Consequently, the height of the optical image E (its position in the Z direction) can be easily changed to a height at which it is easier for the user to see (a height that matches the height of the user). The rest of the effects of the image display device 200 in accordance with the second embodiment are the same as those of the image display device 100 in the first embodiment.

In the illustrated embodiment, the reflecting element aggregate board 203 (e.g., the projection component) is movable in the up and down direction or the vertical direction (e.g., the first direction), and the main-body-side controller 206 (e.g., the controller) is configured to determine whether or not the finger F (e.g., the indicator) has performed the touch operation relative to the optical image E based on the distance image data (e.g., the distance information) and movement information of the reflecting element aggregate board 203 (e.g., the projection component).

In the illustrated embodiment, the reflecting element aggregate board 203 (e.g., the projection component) is movable with respect to the display unit housing 221 (e.g., the housing).

Third Embodiment

Figure 8:
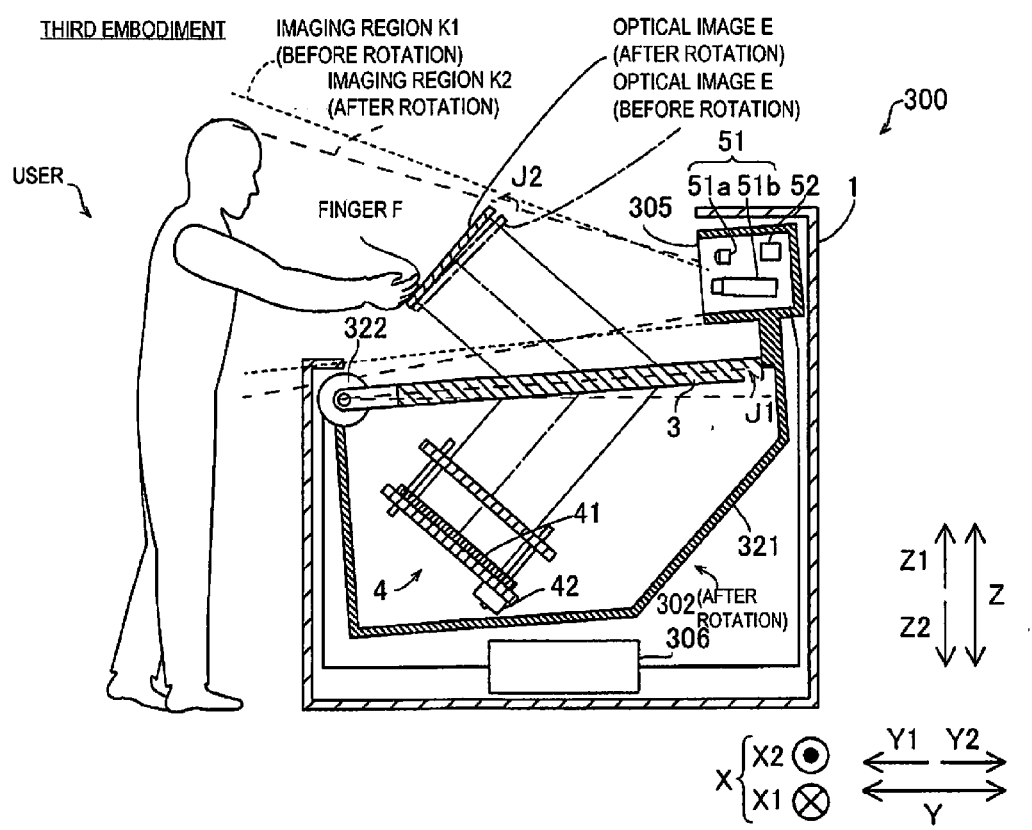
FIG. 8 is a cross sectional view of the overall configuration of an image display device in accordance with a third embodiment.
Figure 9:
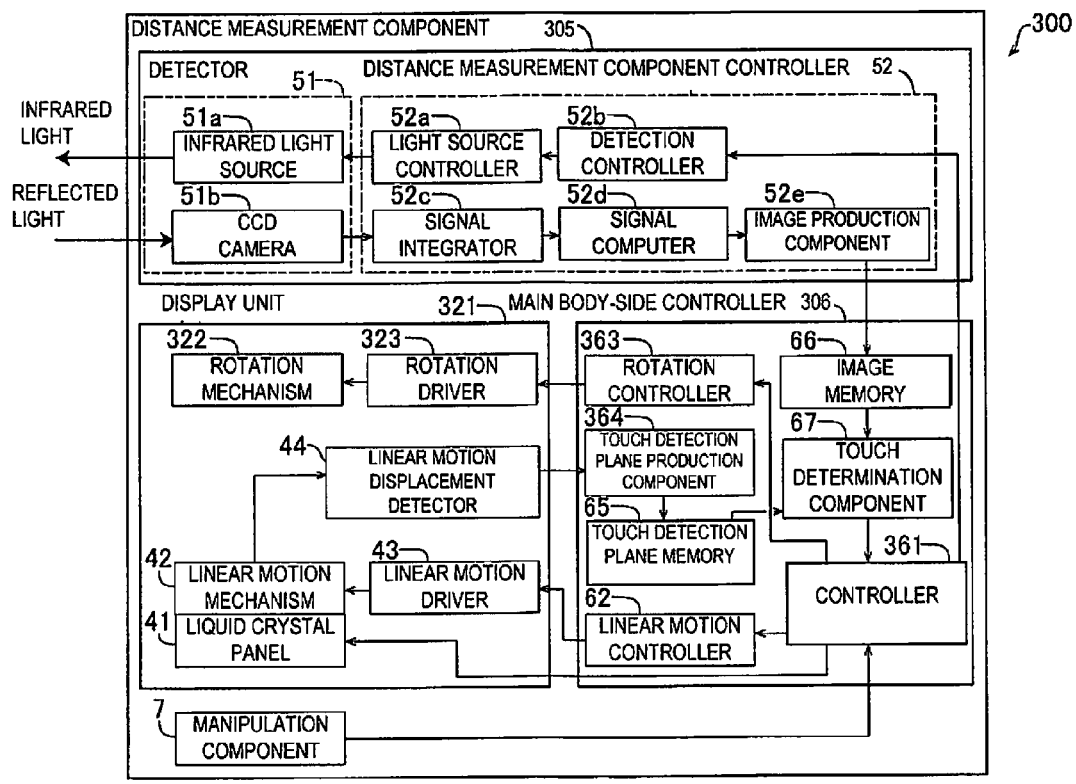
FIG. 9 is a block diagram of the overall configuration of the image display device in accordance with the third embodiment.

Referring now to FIGS. 8 and 9, an image display device 300 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The configuration of the image display device 300 in accordance with the third embodiment will now be described through reference to FIGS. 8 and 9. In this third embodiment, unlike the image display device 100 in the first embodiment, in which the distance measurement component was fixed with respect to the image display device main body, the distance measurement component and the display unit are configured to be able to move integrally with respect to the image display device main body.

As shown in FIGS. 8 and 9, with the image display device 300 in accordance with the third embodiment, a distance measurement component 305 and a display unit 302 are configured to be able to move integrally with respect to the image display device main body 1. More specifically, as shown in FIG. 8, the display unit 302 includes a display unit housing 321, and the distance measurement component 305 is attached to the display unit housing 321. As shown in FIG. 9, the display unit 302 is provided with a rotation mechanism 322 and a rotation driver 323. As shown in FIG. 8, the rotation mechanism 322 is attached to the image display device main body 1, and is configured so that the distance measurement component 305 and the display unit 302 are integrally rotated by the rotation driver 323 in the arrow J1 direction with respect to the image display device main body 1.

When the display unit 302 has rotated in the arrow J1 direction with respect to the image display device main body 1, the optical image E is rotated in the arrow J2 direction by substantially the same rotational angle at which the display unit 302 rotates. Since the distance measurement component 305 rotates integrally with the display unit 302, the imaging region changes from the imaging region K1 to the imaging region K2. However, there is no change in the relative positional relation between the optical image E and the distance measurement component 305 before and after the rotation of the distance measurement component 305.

As shown in FIG. 9, a main body-side controller 306 is provided with a controller 361, a rotation controller 363, and a touch detection plane production component 364. The controller 361 is configured to acquire user manipulation information from the manipulation component 7, and transmit a control signal to the rotation controller 363. The rotation controller 363 is configured to control the operation of the rotation driver 323 based on the control signal from the controller 361.

The touch detection plane production component 364 is configured to acquire movement information from the linear motion displacement detector 44, and produce a touch detection plane based on the acquired movement information. Specifically, the touch detection plane production component 364 in accordance with the third embodiment differs from the touch detection plane production component 64 in accordance with the first embodiment in that it is configured to produce a touch detection plane without using the movement information of the rotation mechanism 322. The touch determination component 67 is configured to determine whether or not the indicator (the finger F) has touched the optical image E based on a comparison of the produced touch detection plane with the distance image data acquired from the distance measurement component 305. The distance image data and the method for comparing the produced touch detection plane with the distance image data acquired from the distance measurement component 305 in the third embodiment are the same as the distance image data and the method for comparing the produced touch detection plane with the distance image data acquired from the distance measurement component 5 in the first embodiment. Also, the rest of the configuration of the image display device 300 in accordance with the third embodiment is the same as that of the image display device 100 in the first embodiment.

The following effects can be obtained with the third embodiment.

With the third embodiment, as discussed above, the distance measurement component 305 and the display unit 302 are configured to be able to move integrally. When the distance measurement component 305 and the display unit 302 are moved integrally to move the position of the optical image E, there is no change in the relative positional relation between the distance measurement component 305 and the display unit 302. Accordingly, by integrally moving the distance measurement component 305 and the display unit 302 to move the position of the optical image E, as illustrated in the third embodiment, it can be properly determined whether or not the indicator (the finger F) has touched the optical image E, without the main body-side controller 306 having to acquire information about the relative positions of the distance measurement component 305 and the display unit 302. The rest of the effects of the image display device 300 in accordance with the third embodiment are the same as those of the image display device 100 in the first embodiment.

In the illustrated embodiment, the distance measurement component 305 and the display unit 302 are integrally movable together.

In the illustrated embodiment, the display unit 302 further has the display unit housing 321 (e.g., the housing) that supports the image display component 4 and the reflecting element aggregate board 3 (e.g., the projection component), and the distance measurement component 305 is fixedly supported by the display unit housing 321 (e.g., the housing).

The embodiments disclosed herein are just examples in every respect, and should not be interpreted as being limiting in nature. The scope of the invention being indicated by the appended claims rather than by the above description of the embodiments, all modifications within the meaning and range of equivalency of the claims are included.

In the first to third embodiments above, a liquid crystal panel is used as the image display component of the present invention, but the present invention is not limited to this. Some image display component other than a liquid crystal panel can be used as the image display component in the present invention. For instance, a screen that is irradiated with light projected from a projector can be used as the image display component of the present invention.

Also, in the first to third embodiments above, the method for acquiring distance image data from the distance measurement component is a method in which distance image data is acquired by computing the elapsed time from the point when an infrared light source emits light until the point when a CCD camera receives light reflected by an indicator, but the present invention is not limited to this. With the present invention, the method for acquiring distance image data can be something other than a method in which the elapsed time is computed from the point when an infrared light source emits light until the point when a CCD camera receives light reflected by an indicator. For instance, a three-dimensional camera provided with two projectors can be used, and the distance between the three-dimensional camera and the indicator can be computed to acquire the distance image data.

Also, in the first to third embodiments above, the display unit is configured to rotate in the YZ plane, but the present invention is not limited to this. With the present invention, the display unit can be configured to rotate in a plane other than the YZ plane. For instance, the display unit can be configured to rotate in the XY plane.

Also, in the first to third embodiments above, the image display device main body of the present invention is disposed on the ground, but the present invention is not limited to this. With the present invention, the image display device main body can be configured to be disposed somewhere other than on the ground. For instance, the image display device main body can be configured to be disposed on a ceiling, or on a wall.

Also, in the first to third embodiments above, the distance information acquired by the distance measurement component of the present invention is acquired as distance image data, but the present invention is not limited to this. With the present invention, the distance information acquired by the distance measurement component can be acquired as some information other than distance image data. Specifically, the distance measurement component can acquire the positional relation between the indicator (such as the user's finger) and the detector.

Also, in the first to third embodiments above, the amount of displacement in the rotational angle or the movement distance is used as the movement information of the present invention, but the present invention is not limited to this. With the present invention, the position after movement or the rotational angle after rotation can be used as movement information.

Also, in the first to third embodiments above, for the sake of convenience the processing of the controller of the present invention is described using a flow drive type of flowchart in which the processing is performed in order along the processing flow, but the present invention is not limited to this. With the present invention, the processing operation of the controller can be performed by an event drive type of processing in which processing is executed for each event. In this case, it can be performed completely by event drive, or event drive and flow drive can be combined.

Also, in the first to third embodiment above, the reflecting element aggregate board 3, the image display component 4, the reflecting element aggregate board 203, the display unit 302 are moved to change the position of the optical image E to a position at which it is easier for the user to see the optical image E. The the reflecting element aggregate board 3, the image display component 4, the reflecting element aggregate board 203, the display unit 302 can be moved either manually or automatically. For example, the the reflecting element aggregate board 3, the image display component 4, the reflecting element aggregate board 203, the display unit 302 can be manually moved by the user to adjust the position of the optical image E. Also, the the reflecting element aggregate board 3, the image display component 4, the reflecting element aggregate board 203, the display unit 302 can be automatically moved based on the user's eye or face positions captured by the CCD camera 51b, and the like.

In the illustrated embodiments, the image display device in accordance with one aspect comprises a display unit that includes an image display component for displaying an image, and a projection component on one side of which the light of the image displayed by the image display component is incident, and which forms the incident light of the image into an optical image as a virtual touch screen corresponding to the image in the air on the other side, the display unit being configured so that the position where the optical image is formed can be moved by moving the image display component and/or the projection component, a distance measurement component that includes a detector for detecting an indicator which virtually touches the optical image, and that acquires distance information indicating the distance from the detector to the indicator, and a controller that determines whether or not the indicator has touched the optical image based on information about the relative movement between the distance measurement component and the image display component and/or the projection component, and the distance information acquired by the distance measurement component.

With the image display device, as discussed above, the controller is configured to determine whether or not the indicator has touched the optical image based on the distance information acquired by the distance measurement component and information about the relative movement between the image display component and/or the projection component and the distance measurement component. Consequently, even if the position where the optical image is formed should move, the position for determining whether or not the indicator has touched the optical image can be moved to a position that corresponds to the position where the optical image is formed, based on movement information. As a result, even if the position where the optical image is formed has moved, it can be properly determined whether or not the indicator has touched the optical image.

With the above image display device in accordance with one aspect, it is preferable if the image display component and the projection component are configured to be able to move relative to each other, and the controller is configured to determine whether or not the indicator has touched the optical image based on the distance information and information about the relative movement between the image display component and the projection component. With this configuration, the position of the optical image can be moved without moving the entire image display device, so an increase in the size of the image display device (the mechanism for moving the position of the optical image) can be suppressed while the optical image can be moved to a height position that is easier for the user to see.

In this case, it is preferable if the image display component is disposed so as to have a predetermined inclination angle with respect to the projection component, and is configured to be able to move with respect to the projection component while maintaining the predetermined inclination angle, and the controller is configured to determine whether or not the indicator has touched the optical image based on the distance information and movement information about the image display component that has moved while maintaining the predetermined inclination angle with respect to the projection component. With this configuration, the distance between the user and the optical image can be easily changed to a distance at which it is easier for the user to see.

With the image display device comprising the image display component configured to be able to move with respect to the projection component while maintaining a predetermined inclination angle, it is preferable if the projection component is configured to be able to rotate around a predetermined rotational axis that lies in the same plane as the projection component, and the controller is configured to determine whether or not the indicator has touched the optical image based on the distance information and information about the rotation of the projection component that has rotated around a predetermined rotational axis that lies in the same plane as the projection component. With this configuration, the inclination angle of the optical image can be easily changed to an angle at which it is easier for the user to see.

With the image display device configured so that the image display component and the projection component are able to move relative to each other, it is preferable if the projection component is disposed so as to be parallel to a horizontal plane, and is configured to be able to move in the up and down direction, and the controller is configured to determine whether or not the indicator has touched the optical image based on the distance information and movement information about the projection component that has moved in the up and down direction. With this configuration, the height of the optical image can be easily changed to a height at which it is easier for the user to see (a height that matches the height of the user).

With the above image display device in accordance with one aspect, it is preferable if the distance measurement component and the display unit are configured to be able to move integrally. Here, when the distance measurement component and the display unit are moved integrally to move the position of the optical image, there is no change in the relative positional relation between the distance measurement component and the display unit. Accordingly, as discussed above, if the position of the optical image is moved by integrally moving the distance measurement component and the display unit, then the controller will be able to properly determine whether or not the indicator has touched the optical image, without having to acquire information about the relative positions of the distance measurement component and the display unit.

With the above image display device in accordance with one aspect, it is preferable if the detector includes a light emitter that emits light, and a light receiver that receives light emitted from the light emitter and reflected by the indicator, and the distance measurement component is configured to acquire distance information from the detector to the indicator based on the elapsed time from the point when the light emitter emits light until the point when the light receiver receives light emitted from the light emitter and reflected by the indicator. With this configuration, distance information from the detector to the indicator can be easily acquired by measuring the elapsed time until the point when the light receiver receives light emitted from the light emitter and reflected by the indicator.

As discussed above, with the present invention, whether or not an indicator has touched an optical image can be properly determined even when the position where the optical image is formed has moved.

Fourth Embodiment

The present invention can also relate to an input device.

There are conventional input devices with which input is performed by using a fingertip to indicate an image displayed in midair (see Japanese Laid-Open Patent Application 2013-205885, for example). With this input device, for example, processing related to an input acceptance region of the image displayed in midair (such as the portion where a button is displayed) is executed by an operation in which this input acceptance region is pressed.

However, with a configuration in which input manipulation is performed on an image displayed in midair, the input acceptance region intuitively grasped by the user can not coincide with the input acceptance region that is assumed by the device. If such mismatching occurs, there will be deviation in the input position, and smooth input can be hindered, such as by having to redo the input manipulation repeatedly.

In light of the above, it is another object to provide an input device with which input manipulation can be performed smoothly using an image displayed in midair.

Figure 10:
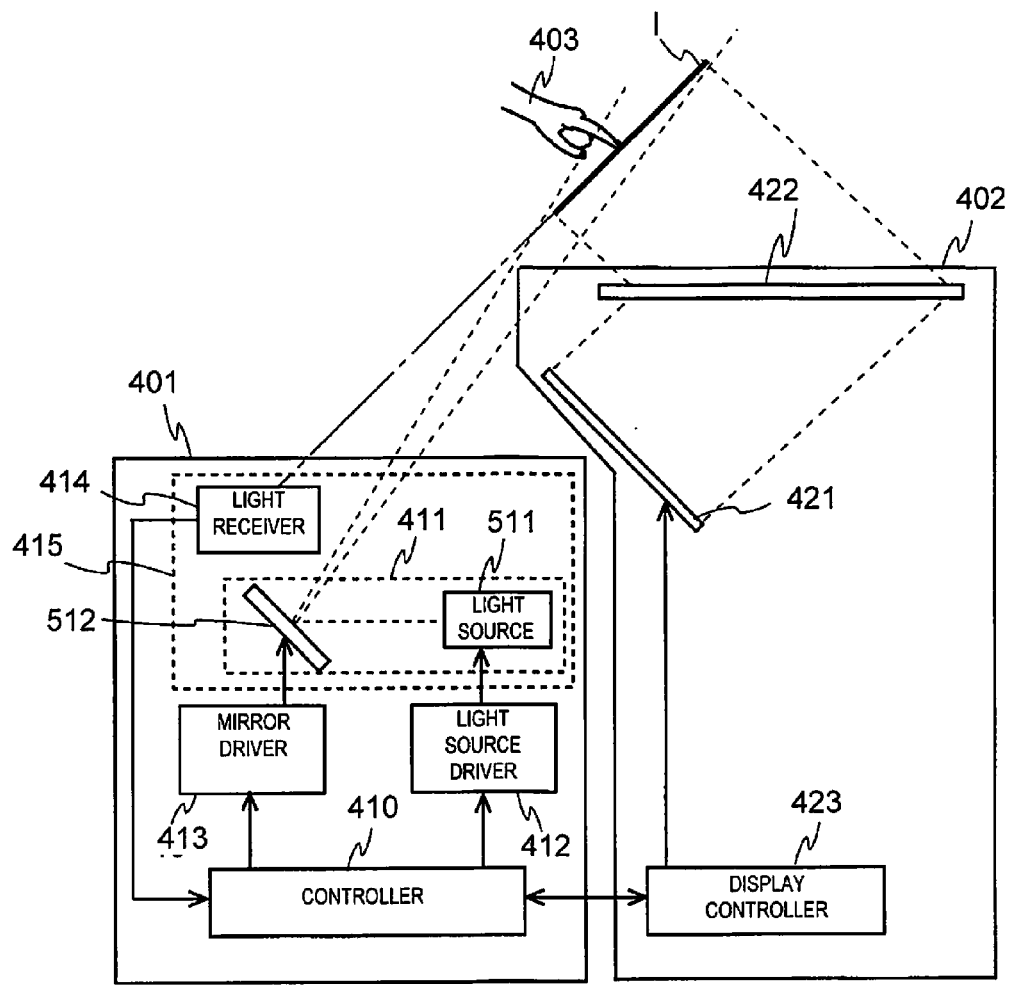
FIG. 10 is a block diagram of the configuration of an input device in accordance with a fourth embodiment.

Referring now to FIG. 10, an input device 401 in accordance with a fourth embodiment will now be explained.

FIG. 10 is a block diagram of the configuration of the input device 401 in accordance with the fourth embodiment. The input device 401 is used to perform input manipulation by using an indicator 403 to indicate an image I displayed in midair by an image display device 402. Then indicator 403 can be a finger, a pointer, or the like, although this is not meant to limit the indicator 403.

The image display device 402 that displays an image in midair will now be described briefly. The image display device 402 comprises an image light emitter 421 that emits image light, an imaging element 422 that forms an image of the image light emitted from the image light emitter 421, in midair and on the opposite side from the image light emitter 421, and a display controller 423 that controls the image light emitter 421.

The image light emitter 421 is able to provide image light for many different images, such as images that are needed to accept input manipulation (such as images that include an input button or other such input acceptance region), and images for giving notification related to input manipulation (such as an image that conveys a message to the user). The image light emitter 421 can be constituted, for example, by a liquid crystal display, a plasma display, an organic EL (electro-luminescence) display, or the like. The image light emitter 421 can also be constituted by a projector and a screen onto which light is projected from the projector.

The imaging element 422 can be a known dihedral or two-sided corner reflector array consisting of a plurality of dihedral or two-sided corner reflectors disposed in a plurality of rows and a plurality of columns. The imaging element 422 made up of a dihedral or two-sided corner reflector array forms a mirror image of an optical image disposed in midair on one side of the element face (the lower side in FIG. 10), at a position in planar symmetry to the element face. This allows the user to perceive that the image is being displayed in midair.

The input device 401 comprises a controller 410 that controls the various components that make up the device. The controller 410 uses various kinds of program or data stored in a memory (not shown) to execute control processing as needed. The controller 410 is provided so as to be able to exchange signals with the display controller 423 provided to the image display device 402. The controller 410 is an example of the processor of the present invention. In the illustrated embodiment, the controller 410 can include at least one microcomputer or processor. The controller 410 can also include other conventional components such as an input interface circuit, an output interface circuit, and storage devices such as a ROM (Read Only Memory) device and a RAM (Random Access Memory) device. The internal RAM stores statuses of operational flags and various control data. The internal ROM stores control programs for various operations. The controller 410 is capable of selectively controlling any of the components in accordance with the control program. It will be apparent to those skilled in the art from this disclosure that the precise structure and algorithms for the controller 410 can be any combination of hardware and software that will carry out the functions of the present invention.

The input device 401 comprises a light source unit 411 that direct a laser beam at the image I displayed in midair by the image display device 402. The light source unit 411 includes a light source 511 that emits an infrared laser beam, and a scanning mirror 512 (an example of an optical scanner) that two-dimensionally scans the infrared laser beam emitted from the light source 511. The scanning mirror 512 can be driven biaxially, that is, horizontally (X direction) and vertically (Y direction), and two-dimensionally scans the laser beam over the image I. This scanning mirror 512 can be constituted, for example, by a resonant MEMS (micro-electro-mechanical system) mirror.

Lenses another such optical members can be included as needed in the light source unit 411. Also, in some cases the light emitted from the light source 511 can be light other than infrared light, such as visible light, but infrared light is preferable.

The input device 401 comprises a light source driver 412 that drives the light source 511 under control from the controller 410. The input device 401 also comprises a mirror driver 413 that drives the scanning mirror 512 under control from the controller 410. The input device 401 also comprises a light receiver 414 that receives the infrared laser beam emitted from the light source unit 411 and reflected by the indicator 403 near the midair image I. The light receiver 414 sends detected information to the controller 410 as needed. The light receiver 414 includes a single light detection element, but can in some cases include a plurality of light detection elements.

A first detector 415, which includes the light source 511, the scanning mirror 512, and the light receiver 414, is an example of the first detector of the present invention. The first detector 415 can detect the position and movement of the indicator 403 with respect to the image I displayed in midair. This will be described in further detail through reference to FIGS. 11, 12A, and 12B.

Figure 11:
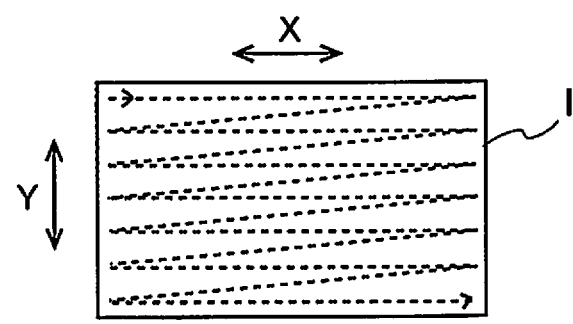
FIG. 11 is a schematic diagram of how an infrared laser beam is scanned over an image displayed in midair, by the input device in accordance with the fourth embodiment.
Figure 12A:
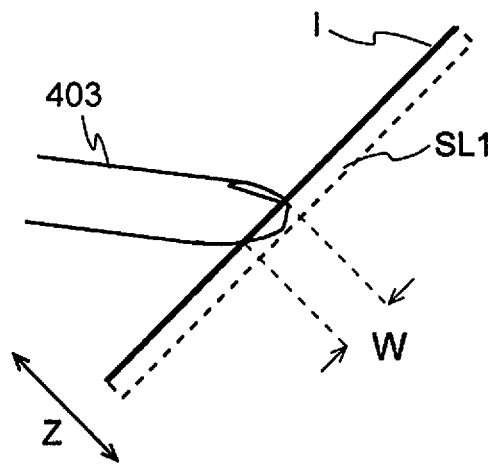
FIG. 12A is a schematic diagram of the state when an indicator has moved into an image displayed in midair.
Figure 12B:
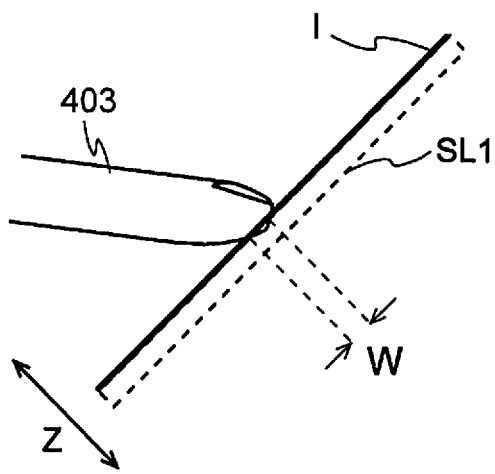
FIG. 12B is a schematic diagram of the state when an indicator has moved into an image displayed in midair.

FIG. 11 is a schematic diagram of how an infrared laser beam is scanned over the image I displayed in midair, by the input device 401 in accordance with the fourth embodiment. In FIG. 11, the X direction is the horizontal direction of the screen, and the Y direction is the vertical direction of the screen. FIGS. 12A and 12B are schematic diagrams of the state when the indicator 403 has moved into the image I displayed in midair. The amount by which the indicator 403 has moved into the image I is different in FIGS. 12A and 12B. The amount by which the indicator 403 has moved into the image I is greater in FIG. 12B than in FIG. 12A.

As shown in FIG. 11, the infrared laser beam emitted from the light source 511 is scanned in a specific pattern by the drive of the scanning mirror 512, so as to cover the entire range of the image I (the screen). This scanning in a specific pattern is repeated over and over. In FIG. 11 an example is shown in which the infrared laser beam is scanned in a raster pattern, but any other pattern can be used instead, so long as the pattern covers the entire range of the image I.

When the indicator 403 approaches the image I, the infrared laser beam emitted from the light source 511 is reflected by the indicator 403. The light receiver 414 is adjusted to detect reflected light from the indicator 403 that has moved into a sensing layer SL1 (see FIGS. 12A and 12B) that substantially coincides with the screen. Accordingly, movement of the indicator 403 toward and away from the image I can be detected by the first detector 415 constituted by the light source 511, the scanning mirror 512, and the light receiver 414.

The controller 410 also ascertains the scanning timing of the infrared laser beam emitted from the light source unit 411. Accordingly, the controller 410 can specify the position in the XY direction of the indicator 403 that moves into the image I, from the timing at which the reflected light is received by the light receiver 414. As shown in FIGS. 12A and 12B, if the amount by which the indicator 403 moves into the image I differs, the size of the indicator 403 detected at the sensing layer SL1 (see W in FIGS. 12A and 12B) will also differ. Accordingly, the controller 410 can specify the position (movement) in the depth direction (a direction perpendicular to the screen; the Z direction) of the indicator 403 that moves into the image I based on information outputted from the light receiver 414.

As can be understood from the above description, if an input acceptance region for input manipulation (such as an image of an input button) is set in the image I displayed in midair by the image display device 402, then input manipulation can be performed by indicating the input acceptance region with the indicator 403. However, when input manipulation is performed on the image I displayed in midair, the input acceptance region intuitively grasped by the user can not always coincide with the input acceptance region assumed by the device.

Figure 13A:
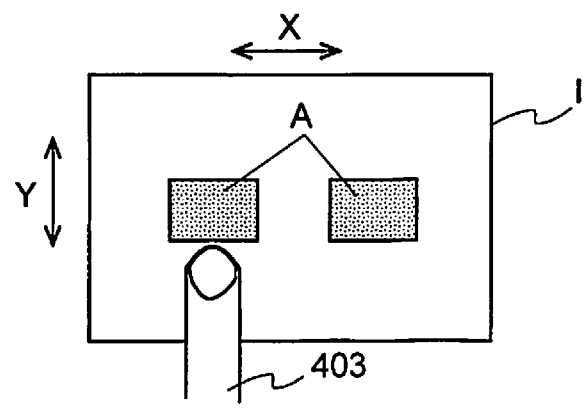
FIG. 13A is a schematic diagram of an example of the state when a user performing input manipulation has misperceived the image, and shows the state as viewed from the front.
Figure 13B:
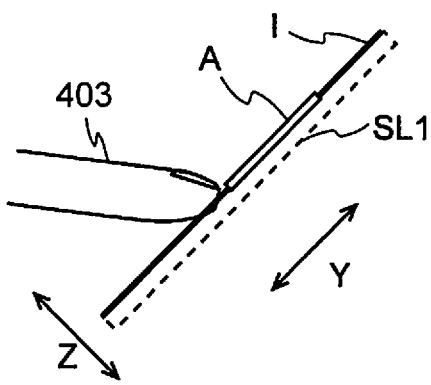
FIG. 13B is a schematic diagram of an example of the state when a user performing input manipulation has misperceived the image, and shows the state as viewed from the side.

FIGS. 13A and 13B are schematic diagrams of an example of the state when a user performing input manipulation has misperceived the image. FIG. 13A shows the state as viewed from the front, and FIG. 13B shows the state as viewed from the side. Because the user has misperceived the image, he presses a position that is offset downward from the input acceptance region A.

When this happens, the user will further press down in the input acceptance region A, or will press the input acceptance region A again, for example. The input device 401 recognizes this user operation, detects that the user has misperceived the image, and notifies the user of this misperception.

Figure 14:
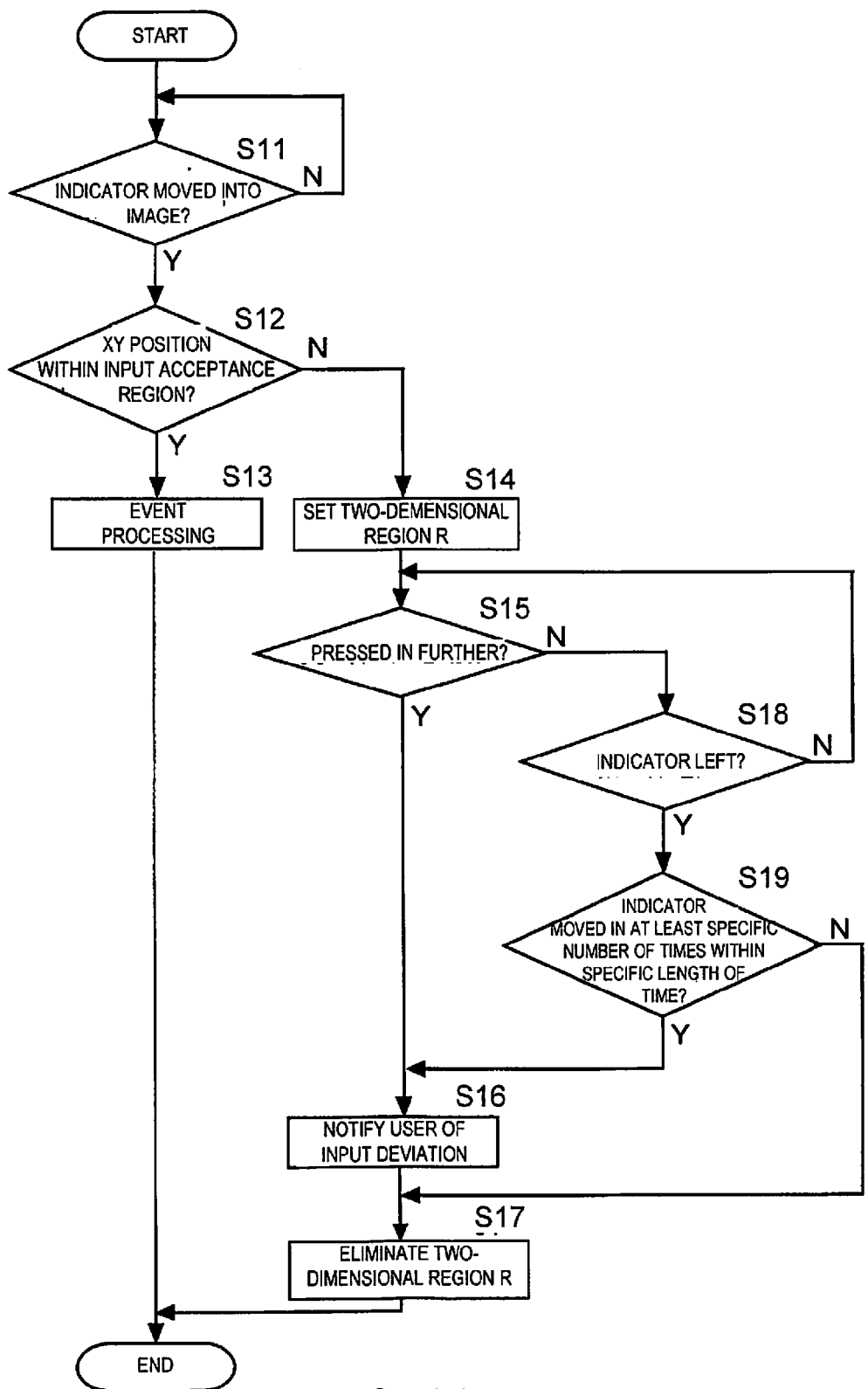
FIG. 14 is a flowchart of the processing flow for user input manipulation with the input device in accordance with the fourth embodiment.

FIG. 14 is a flowchart of the processing flow for input manipulation with the indicator 403 in the input device 401 in accordance with the fourth embodiment. The processing flow shown in FIG. 14 is just an example, and can be suitably modified. First, the controller 410 uses the first detector 415 to monitor whether or not the indicator 403 has moved into the image I (step S11). The controller 410 detects that the indicator 403 has moved into the image I when the indicator 403 moves into the sensing layer SL1.

Upon deciding that the indicator 403 has moved into the image I, the controller 410 finds the position (region) of the indicator 403 in the XY direction (the screen direction), and confirms whether or not the indicator 403 is within the input acceptance region A (step S12). Information related to the input acceptance region A can be acquired from the display controller 423 of the image display device 402. Upon deciding that the XY position of the indicator 403 is within the input acceptance region A (Yes in step S12), the controller 410 performs processing to execute an event corresponding to this input acceptance region A (step S13).

On the other hand, if the controller 410 decides that the XY position of the indicator 403 is outside the input acceptance region A (No in step S12), the controller 410 sets a two-dimensional region R that includes the previously acquired XY position of the indicator 403 (step S14). The two-dimensional region R is a region that is centered on the previously acquired position to which the indicator 403 has advanced in the XY direction (advancement region), which has been expanded by a few percent in the X direction and the Y direction. The two-dimensional region R can in some cases be the same as the previously acquired advancement region of the indicator 403, but when subsequent processing is taken into account, it is preferably somewhat larger than the previously acquired region.

Upon setting the two-dimensional region R, the controller 410 confirms whether or not the indicator 403 has been pressed further into the two-dimensional region R (step S15). As discussed above, if the indicator 403 moves in a direction (Z direction) perpendicular to the screen in a state of having moved into the sensing layer SL1, this can be detected by the controller 410. Accordingly, the controller 410 can confirm whether or not the indicator 403 has been pressed further in.

Upon deciding that the indicator 403 has been pressed further in (Yes in step S15), the controller 410 decides that the user has misperceived the image, and performs processing to notify the user that the input position of the indicator 403 has shifted (error notification) (step S16). Examples of the method for notifying the user that the input position has shifted include displaying the above-mentioned two-dimensional region R in the image I, changing the color of a particular input acceptance region A based on the positional relation between the two-dimensional region R and the input acceptance regions A (there are usually more than one), and displaying in the image I a message to the effect that the position has shifted. A combination of these can also be used as the method for notifying the user of a shift in position. In some cases, audio can be utilized as the method for notifying the user of a shift in position.

When the image I is used to notify the user of a position shift, the controller 410 performs a processing operation in conjunction with the display controller 423 of the image display device 402.

After processing has been performed to notify the user of a shift in the input position, the controller 410 eliminates the two-dimensional region R (step S17), ends the series of processing on input manipulation, and awaits the next input manipulation (step S11).

Meanwhile, if the controller 410 decides that the indicator 403 has not been pressed in further (No in step S15), the controller 410 confirms whether or not the indicator 403 has been retracted from the image I (step S18). If the indicator 403 is no longer in the sensing layer SL1, the controller 410 detects that the indicator 403 has been retracted from the image I. When the controller 410 decides that the indicator 403 has not been retracted from the image I (No in step S18), the flow returns to step S15 since it is possible that the indicator 403 will be pressed in later.

If it is determined that the indicator 403 has been retracted from the image I (Yes in step S18), the controller 410 confirms whether or not the controller 410 has moved into the two-dimensional region R at least a specific number of times within a specific length of time (step S19). The specific number of times can be just once, or can be two or more times. If it is determined that the indicator 403 has moved into the two-dimensional region R at least a specific number of times within a specific length of time (Yes in step S19), the controller 410 decides that the user is misperceiving the image since input manipulation is being performed repeatedly in the two-dimensional region R. Accordingly, the flow proceeds to the above-mentioned step S16, and processing is performed to notify the user that the input position of the indicator 403 has shifted.

If it is determined that the indicator 403 has not moved into the two-dimensional region R at least a specific number of times within a specific length of time (No in step S19), the controller 410 decides that there is no misperception on the part of the user, and the flow proceeds to step S17.

With the input device 401 in the fourth embodiment given above, when the advancement position of the indicator 403 into the image I has deviated from the input acceptance region A, and the indicator 403 is making a characteristic movement, it is determined that the user is misperceiving the image, and the user is notified of an error. Therefore, the misperception can be corrected and the input manipulation carried out smoothly. Also, with the input device 401 in the fourth embodiment, an error notification is not given every time a simple mistake causes the input position to shift, which makes the input device 401 more convenient for the user.

Thus, in the first embodiment, the input device 401 comprises the first detector 415 that is able to detect the position and movement of the indicator 403 with respect to the image I displayed in midair, and the controller (e.g., the processor) 410 that performs input processing based on information detected by the first detector 415. The controller 410 determines whether or not to notify the user of an error based on the movement of the indicator 403, when deviation is detected between the position where the indicator 403 moves into the image I, and an input acceptance region included in the image I.

Fifth Embodiment

Figure 15:
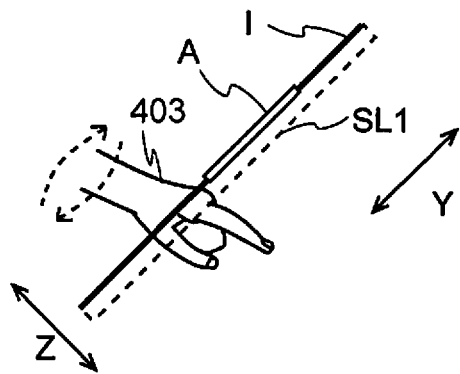
FIG. 15 is a schematic diagram of an example of the state when a user performing input manipulation has misperceived the depth direction, and shows the state as viewed from the side.

Referring now to FIG. 15, an input device in accordance with a fifth embodiment will now be explained. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity.

In the fourth embodiment, the input device 401 is configured to detect only user misperception in the screen direction (the XY direction) and notify the user of this. However, as shown in FIG. 15, it is conceivable that the user will misperceive not only the screen direction, but also the depth direction (a direction perpendicular to the screen; the Z direction).

FIG. 15 is a schematic diagram of an example of the state when a user performing input manipulation has misperceived the depth direction, and shows the state as viewed from the side. In FIG. 15, because the user is misperceiving the XY direction, the indicator 403 moves to a position that is offset from the input acceptance region A. Also, because the user is misperceiving the Z direction, he will move the indicator 403 to search for the input acceptance region A while the indicator 403 has moved into the image I.

The input device in the fifth embodiment is configured substantially the same as the input device 401 in the fourth embodiment, but its configuration differs from the fourth embodiment in that the user can be notified of the misperception shown in FIG. 15, allowing input manipulation to proceed smoothly. The following description will focus on this difference, and the detailed configuration of the input device will be omitted for the sake of brevity.

Figure 16:
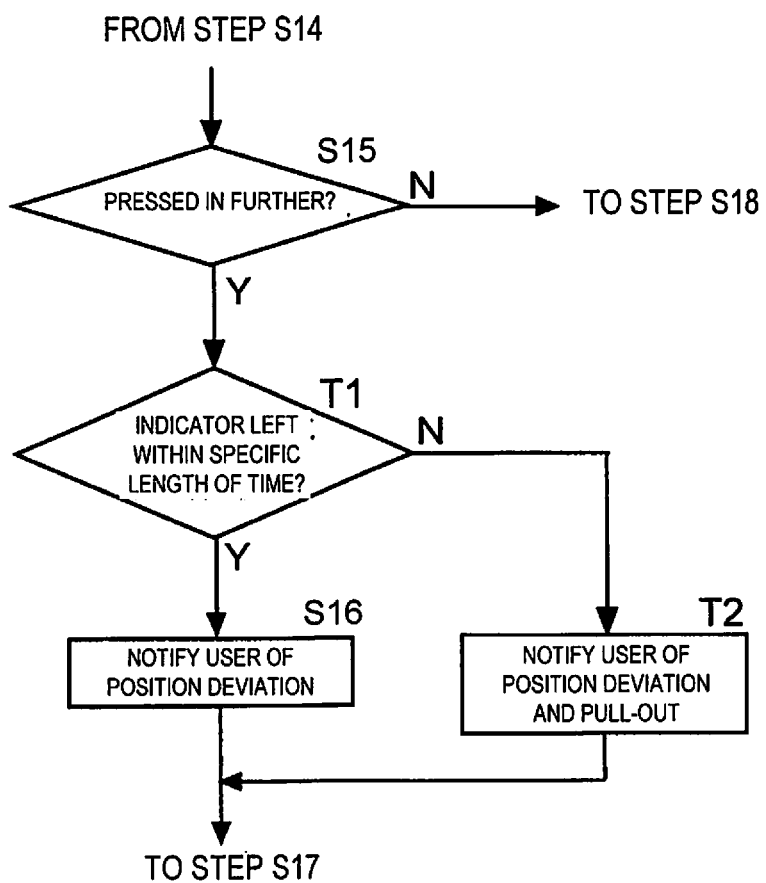
FIG. 16 is a flowchart of part of the processing flow for user input manipulation with an input device in accordance with a fifth embodiment.

FIG. 16 is a flowchart of part of the processing flow for user input manipulation with the input device in accordance with the fifth embodiment. The processing executed by the input device in the fifth embodiment is substantially the same as the processing flow shown in FIG. 14, but part of it is different. The controller 410 confirms whether or not the indicator 403 has been pressed further in after positional deviation of the indicator 403 in the screen direction (the XY direction) has been detected and the two-dimensional region R has been set (step S15). This point is the same as in the fourth embodiment. The processing when the indicator 403 has not been pressed further in (No in step S15) is also the same as in the fourth embodiment.

On the other hand, if it is determined that the indicator 403 has been pressed further in (Yes in step S15), the controller 410 performs processing that is different from that in the fourth embodiment. Specifically, when it is determine that the indicator 403 has been pressed further in, the controller 410 does not instantly perform processing to notify the user of deviation in the input position (error notification), and instead confirms whether or not the indicator 403 has left within a specific length of time (step T1).

If it is determined that the indicator 403 has left within a specific length of time (Yes in step T1), it is determine that there is no user misperception of the Z direction. In this case, just as in the fourth embodiment, the controller 410 simply performs processing to notify the user that the input position of the indicator 403 has shifted (step S16). On the other hand, if it is determined that the indicator 403 has not left within a specific length of time (No in step T1), the user is misperceiving the Z direction, and it is predicted that the indicator 403 will not be pulled out of the image I for some time. In this case, the controller 410 performs processing to notify the user not only that the input position of the indicator 403 has shifted, but also that the indicator 403 should be pulled out of the image I (step T2). This notification can involve the use of the image I, or in some cases can involve the use of audio.

After steps S16 and T2, the flow proceeds to step S17, and from there on the processing is the same as in the fourth embodiment.

With the fifth embodiment given above, in addition to the effect of the fourth embodiment, it can also be anticipated that there will be less misperception of the depth direction by the user, so the user can carry out input manipulation more smoothly.

Sixth Embodiment

Figure 17:
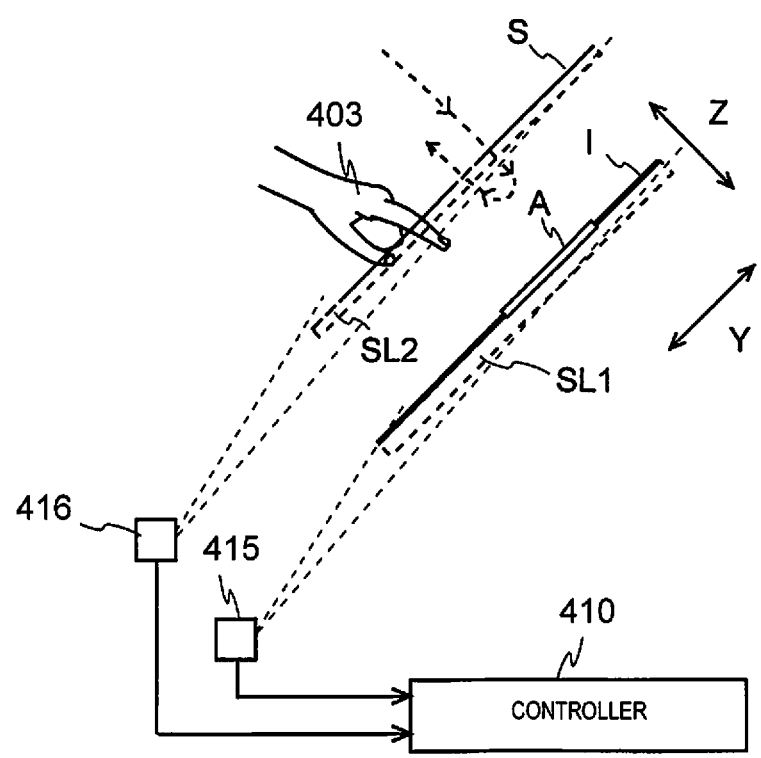
FIG. 17 is a schematic diagram illustrating the simplified configuration of the input device in accordance with a sixth embodiment.

Referring now to FIG. 17, an input device in accordance with a sixth embodiment will now be explained. In view of the similarity between the fourth and sixth embodiments, the parts of the sixth embodiment that are identical to the parts of the fourth embodiment will be given the same reference numerals as the parts of the fourth embodiment. Moreover, the descriptions of the parts of the sixth embodiment that are identical to the parts of the fourth embodiment may be omitted for the sake of brevity.

FIG. 17 is a schematic diagram illustrating the simplified configuration of the input device in accordance with the sixth embodiment. As shown in FIG. 17, if the user is misperceiving the depth direction, there is the possibility that the indicator 403 will not move into the image I, and no input manipulation will be carried out. The input device of the sixth embodiment includes a way to avoid such situations. The configuration of the input device in the sixth embodiment is substantially the same as the configuration of the input device 401 in the fourth embodiment or of the input device in the fifth embodiment, so equivalent portions will not be described again, and the description will focus on the differences.

Basically, the input device in the sixth embodiment is identical to the input device 401 in the fourth embodiment, except for a second detector 416. As shown in FIG. 17, the input device in the sixth embodiment includes not only the first detector 415, but also the second detector 416 capable of detecting movement (in and out) of the indicator 403 with respect to a detection surface S set at a position away from the image I on the front side. The detection surface S is substantially parallel to the plane of the image I. The second detector 416 is similar to the first detector 415 in that it includes a light source, a scanning mirror, and a light receiver. The light source is preferably a laser light source that emits an infrared laser beam.

The scanning mirror included in the second detector 416 is provided so that a specific range of the detection surface S can be scanned. This specific range is suitably set so as to allow detection of a situation in which the indicator 403 approaching the image I leaves without moving into the image I. The scanning of the detection surface S can, for example, be in a raster pattern, just as in the scanning of the image I, and this pattern is scanned repeatedly. The light receiver included in the second detector 416 is adjusted so as to detect reflected light from the indicator 403 that has moved into a sensing layer SL2 that substantially coincides with the detection surface S.

Figure 18:
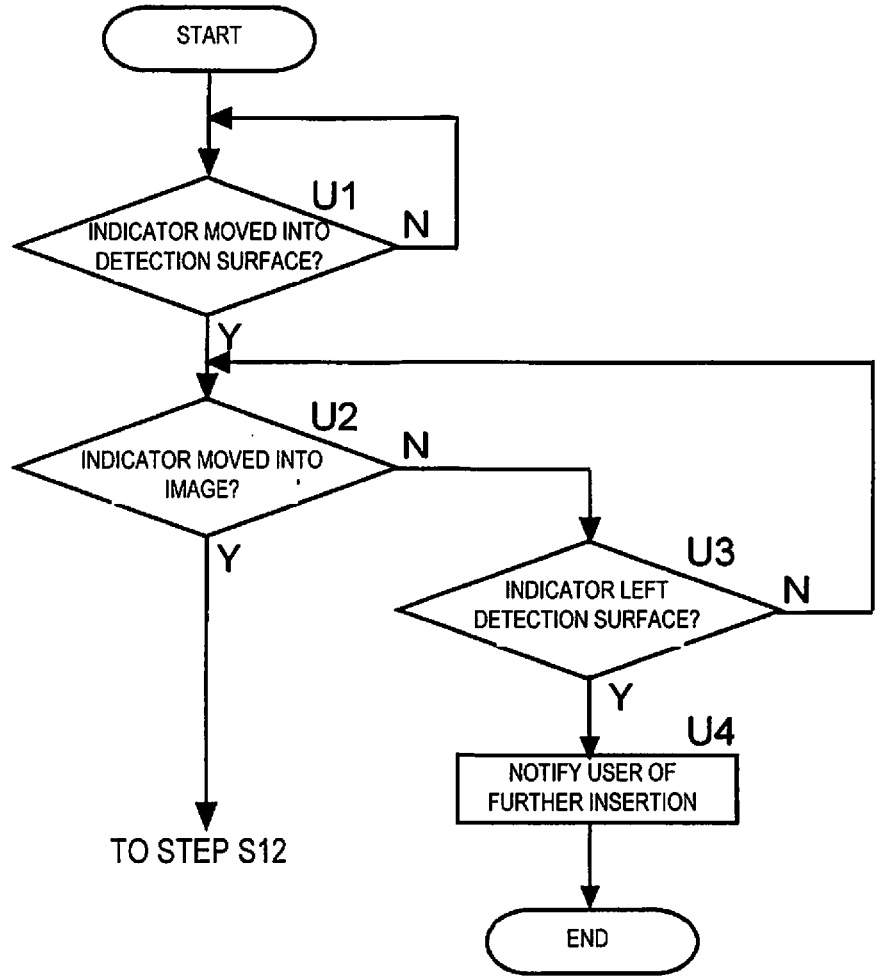
FIG. 18 is a flowchart of part of the processing flow for user input manipulation with the input device in accordance with the sixth embodiment.

FIG. 18 is a flowchart of part of the processing flow for user input manipulation with the input device in accordance with the sixth embodiment. The processing executed by the input device in the sixth embodiment is substantially the same as the processing flow shown in FIG. 14, or the processing flow shown in FIG. 16 (which is a modification of the processing flow shown in FIG. 14), but differs in that steps U1 to U4 are performed instead of the above-mentioned step S11.

The controller 410 monitors whether or not the indicator 403 has moved into the detection surface S (step U1). If the indicator 403 moves into the sensing layer SL2, which is provided so as to substantially coincide with the detection surface S, the controller 410 detects that the indicator 403 has moved into the detection surface S. If it is determined that the indicator 403 has moved into the detection surface S (Yes, in step U1), the controller 410 uses the first detector 415 to confirm whether or not the indicator 403 has moved into the image I (step U2). If the indicator 403 moves into the sensing layer SL1, which is provided so as to substantially coincide with the image I, the controller 410 detects that the indicator 403 has moved into the image I.

If it is determined that the indicator 403 has moved into the image I (Yes in step U2), the controller 410 decides that so far there is no user misperception of the depth direction, so the flow proceeds to the above-mentioned step S12. The processing from step S12 onward is the same as that in the fourth embodiment or the fifth embodiment.

On the other hand, if it is determined that the indicator 403 has not moved into the image I, the controller 410 confirms whether or not the indicator 403 has left the detection surface S (step U3) by using the second detector 416. If it is determined that the indicator 403 has not left the detection surface S (No in step U3), the controller 410 goes back to step U2 and performs the processing from step U2 onward. If it is determined that the indicator 403 has left the detection surface S (Yes in step U3), the controller 410 determines that the user is misperceiving the depth direction, and notifies the user of inadequate insertion of the indicator 403 (error notification) (step U4). This notification can involve the use of the image I, or in some cases can involve the use of audio. When this notification is given, the processing related to input manipulation in one example is temporarily ended, and the system awaits the next input manipulation (step U1).

With the sixth embodiment given above, once the indicator 403 moves in and out with respect to the detection surface S (leaving the detection surface S without moving into the image I), it is determined that the user is misperceiving the depth direction. This, however, is just one example. Specifically, the configuration can be such that if the movement of the indicator 403 in and out with respect to the detection surface S is repeated for at least a specific number of times, it is determined that the user is misperceiving the depth direction.

Figure 19:
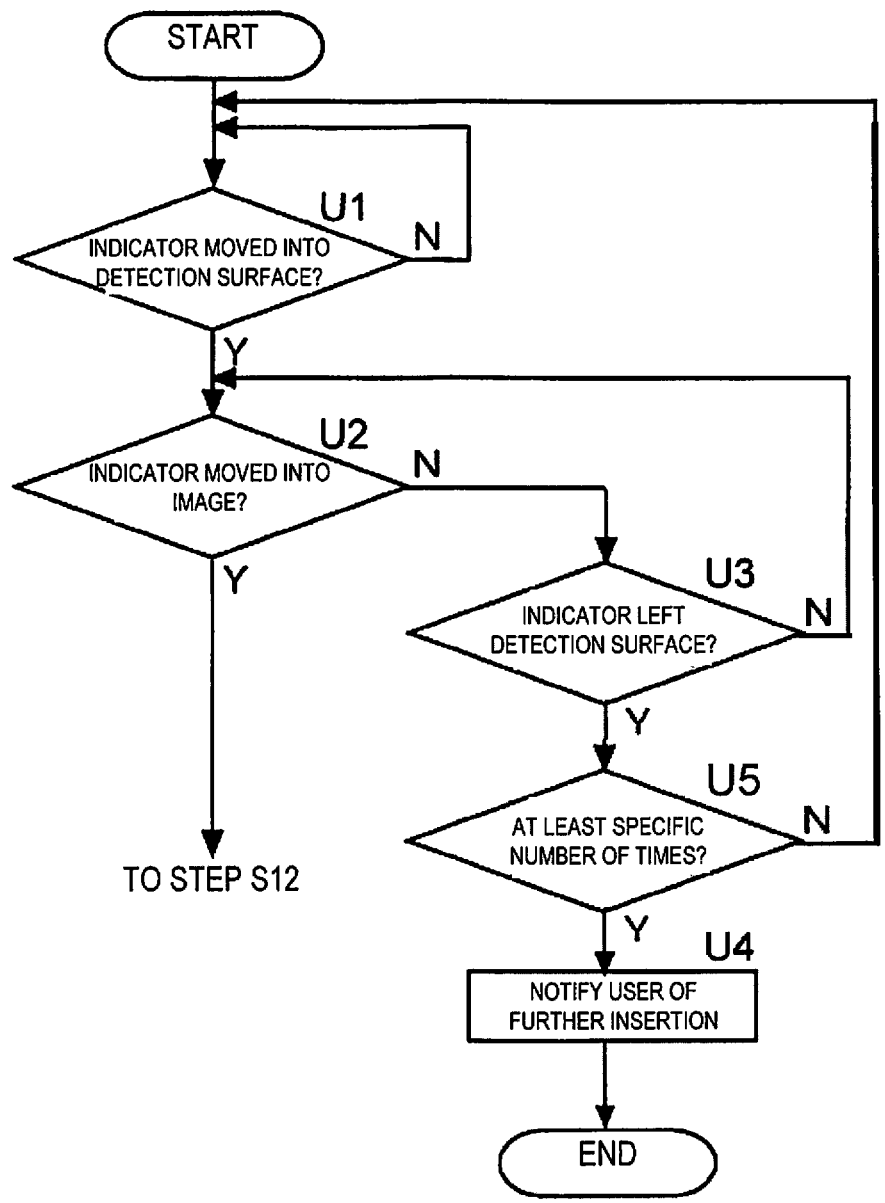
FIG. 19 is a flowchart of part of the processing flow in accordance with a modification example of the sixth embodiment.

Specifically, FIG. 19 is a flowchart of part of the processing flow in accordance with a modification example of the sixth embodiment. With the processing flow illustrated in FIG. 18, if it is determined that the indicator 403 has left the detection surface S (Yes in step U3), then the controller 410 determines that the user is misperceiving the depth direction, and notifies the user of inadequate insertion of the indicator 403 (error notification) (step U4). On the other hand, with the processing flow illustrated in FIG. 19, if it is determined that the indicator 403 has left the detection surface S (Yes in step U3), then the controller 410 determines whether or not the movement of the indicator 403 in and out with respect to the detection surface S has been repeated for at least a specific number of times (step U5). If the controller 410 determines that the movement of the indicator 403 in and out with respect to the detection surface S has been repeated for a number of times less than the specific number of times (No in step U5), then the process returns to step U1. On the other hand, if the controller 410 determines that the movement of the indicator 403 in and out with respect to the detection surface S has been repeated for the specific number of times (Yes in step U5), then the process proceeds to step U4, and the controller 410 notifies the user of inadequate insertion of the indicator 403 (error notification) (step U4).

With the configuration of the sixth embodiment given above, in addition to the effects of the fourth and fifth embodiments, it is anticipated that user misperception of the depth direction can be reduced, allowing the user to perform input manipulation more smoothly.

The embodiments given above are illustrative examples of the present invention, and the scope of application of the present invention is not limited to or by the configuration of the embodiments given above. The above embodiments can of course be suitably modified without departing from the technological concept of the present invention.

For instance, in the above embodiments, the input device 401 and the image display device 402 are each provided as a separate device, but this is not the only option, and the input device can instead be configured to combine an image display function. For example, an input manipulation function and an image display function can be realized by incorporating the components that are necessary for an image projection device into the input device of the present invention.

In some cases, the configuration can be such that an imaging element is used to detect the movement and position of the indicator 403 with respect to the image I.

The processing flows for user input manipulation processing with input devices in accordance with the fourth, fifth and sixth embodiments can also be performed by the image display devices 100, 200 and 300 in accordance with the first, second and third embodiments.

Specifically, the processing flow as illustrated in FIG. 14 can be performed by the image display device 100 illustrated in FIG. 3. Referring now to FIGS. 3, 4 and 14, the processing flow performed by the image display device 100 will be briefly explained. First, the main body-side controller 6 uses the touch determination component 67 to determine whether or not the finger F has moved into the optical image E (step S11). The touch determination component 67 detects that the finger F has moved into the optical image E when the finger F moves into the touch detection plane H1 (without movement of the reflecting element aggregate board 3 or the liquid crystal panel 41) or the touch detection plane H2 (with movement of the reflecting element aggregate board 3 or the liquid crystal panel 41).

Upon deciding that the finger F has moved into the optical image E, the touch determination component 67 transmit the position (region or coordinate) of the finger F in the XY direction (the screen direction) to the controller 61. Then, the controller 61 confirms whether or not the finger F is within an input acceptance region, such as input keys, defined in the optical image E (step S12). In the illustrated embodiment, the controller 61 also control the liquid crystal panel 41 to display the optical image E on the liquid crystal panel 41. Thus, the controller 61 also can achieve the information (position or coordinate) related to the input acceptance region. Upon deciding that the XY position of the finger F is within the input acceptance region (Yes in step S12), then the controller 61 also performs processing to execute an event corresponding to this input acceptance region (step S13).

On the other hand, if the controller 61 decides that the XY position of the finger F is outside the input acceptance region (No in step S12), then the controller 61 sets a two-dimensional region that includes the previously acquired XY position of the finger F (step S14). The two-dimensional region is a region that is centered on the previously acquired position to which the finger F has advanced in the XY direction (advancement region), which has been expanded by a few percent in the X direction and the Y direction. The two-dimensional region can in some cases be the same as the previously acquired advancement region of the finger F, but when subsequent processing is taken into account, it is preferably somewhat larger than the previously acquired region.

Upon setting the two-dimensional region, the controller 61 confirms whether or not the finger F has been pressed further into the two-dimensional region (step S15). If the finger F moves in a direction perpendicular to the screen in a state of having moved into the touch detection plane H1 (or H2), this can be detected by the controller 61 based on the distance image data (see FIG. 4) since the distance from the detector 51 to the finger F becomes smaller. Accordingly, the controller 61 can confirm whether or not the finger F has been pressed further in.

Upon deciding that the finger F has been pressed further in (Yes in step S15), then the controller 61 decides that the user has misperceived the image, and performs processing to notify the user that the input position of the finger F has shifted (error notification) (step S16). Examples of the method for notifying the user that the input position has shifted include displaying the above-mentioned two-dimensional region in the optical image E, changing the color of a particular input acceptance region based on the positional relation between the two-dimensional region and the input acceptance region, and displaying in the optical image E a message to the effect that the position has shifted. A combination of these can also be used as the method for notifying the user of a shift in position. In some cases, audio can be utilized as the method for notifying the user of a shift in position.

When the optical image E is used to notify the user of a position shift, the controller 61 performs this display operation to drive the liquid crystal panel 41 and to display the notification on the optical image E.

After processing has been performed to notify the user of a shift in the input position, the controller 61 eliminates the two-dimensional region (step S17), ends the series of processing on input manipulation, and awaits the next input manipulation (step S11).

Meanwhile, if the controller 61 decides that the finger F has not been pressed in further (No in step S15), then the controller 61 confirms whether or not the finger F has been retracted from the optical image E (step S18). If the finger F is no longer in the touch detection plane H1 (or H2), then the controller 61 detects that the finger F has been retracted from the optical image E. When the controller 61 decides that the finger F has not been retracted from the optical image E (No in step S18), then the flow returns to step S15 since it is possible that the finger F will be pressed in later.

If it is determined that the finger F has been retracted from the optical image E (Yes in step S18), then the controller 61 confirms whether or not the controller 61 has moved into the two-dimensional region at least a specific number of times within a specific length of time (step S19). The specific number of times can be just once, or can be two or more times. If it is determined that the finger F has moved into the two-dimensional region at least the specific number of times within the specific length of time (Yes in step S19), then the controller 61 decides that the user is misperceiving the optical image E since input manipulation is being performed repeatedly in the two-dimensional region. Accordingly, the flow proceeds to the above-mentioned step S16, and processing is performed to notify the user that the input position of the finger F has shifted.

If it is determined that the finger F has not moved into the two-dimensional region at least the specific number of times within the specific length of time (No in step S19), then the controller 61 decides that there is no misperception on the part of the user, and the flow proceeds to step S17.

The processing flow as illustrated in FIG. 14 can also be performed by the image display device 200 illustrated in FIG. 7 or by the image display device 300 illustrated in FIG. 9 in the same manner as performed by the image display device 100 illustrated in FIG. 3. In view of the similarity between the configuration of the image display device 100 and the configurations of the image display device 200 and 300, the detailed descriptions of the processing flow performed by the image display device 200 or 300 will be omitted for the sake of brevity.

In the illustrated embodiment, the main body-side controller 6 (206, 306) (e.g., the controller) is configured to determine whether or not to perform the error notification based on movement of the finger F (e.g., the indicator) (step S16) upon detecting deviation between a position of the finger F (e.g., the indicator) on the optical image E and the input acceptance region of the optical image E (No in step S12).

In the illustrated embodiment, the main body-side controller 6 (206, 306) (e.g., the controller) is configured to perform the error notification (step S16) upon determining that the finger F (e.g., the indicator) further moves into the optical image E (Yes in step S15) after the deviation is detected (No in step S12).

In the illustrated embodiment, the main body-side controller 6 (206, 306) (e.g., the controller) is configured to perform the error notification (step S16) upon determining that the finger F (e.g., the indicator) repeatedly moves into the two-dimensional region (e.g., the region) of the optical image E that is deviated from the input acceptance region (Yes in step S19) after the deviation is detected (No in step S12).

Furthermore, the processing flow as illustrated in FIG. 16 can also be performed by the image display device 100 illustrated in FIG. 3. Referring now to FIGS. 3, 4 and 16, the processing flow performed by the image display device 100 will be briefly explained. The processing executed by the image display device 100 is substantially the same as the above-mentioned processing flow shown in FIG. 14 and performed by the image display device 100, but part of it is different. The controller 61 confirms whether or not the finger F has been pressed further in after positional deviation of the finger F in the screen direction (the XY direction) has been detected and the two-dimensional region has been set (step S15). This point is the same as illustrated in FIG. 14. The processing when the finger F has not been pressed further in (No in step S15) is also the same as illustrated in FIG. 14.

On the other hand, if it is determined that the finger F has been pressed further in (Yes in step S15), then the controller 61 performs processing that is different from the processing as illustrated in FIG. 14. Specifically, when it is determine that the finger F has been pressed further in, then the controller 61 does not instantly perform processing to notify the user of deviation in the input position (error notification), and instead confirms whether or not the finger F has left the optical image E (touch detection plane H1 or H2) within a specific length of time (step T1).

If it is determined that the finger F has left the optical image E within the specific length of time (Yes in step T1), then it is determine that there is no user misperception of the Z direction (perpendicular to the optical image E). In this case, just as illustrated in FIG. 14, the controller 61 simply performs processing to notify the user that the input position of the finger F has shifted (step S16). On the other hand, if it is determined that the finger F has not left the optical image E within the specific length of time (No in step T1), then the user is misperceiving the Z direction, and it is predicted that the finger F will not be pulled out of the optical image E for some time. In this case, the controller 61 performs processing to notify the user not only that the input position of the finger F has shifted, but also that the finger F should be pulled out of the optical image E (step T2). This notification can involve the use of the optical image E, or in some cases can involve the use of audio.

After steps S16 and T2, the flow proceeds to step S17, and from there on the processing is the same as illustrated in FIG. 14.

The processing flow as illustrated in FIG. 16 can also be performed by the image display device 200 illustrated in FIG. 7 or by the image display device 300 illustrated in FIG. 9 in the same manner as performed by the image display device 100 illustrated in FIG. 3. In view of the similarity between the configuration of the image display device 100 and the configurations of the image display device 200 and 300, the detailed descriptions of the processing flow performed by the image display device 200 or 300 will be omitted for the sake of brevity.

In the illustrated embodiment, the main body-side controller 6 (206, 306) (e.g., the controller) is configured to perform the error notification (step T2) upon determining that the finger F (e.g., the indicator) stays in the optical image E for at least a specific length of time (No in step T1) after the deviation is detected (No in step S12).

Furthermore, the processing flow as illustrated in FIG. 18 can also be performed by the image display device 100 illustrated in FIG. 3. Referring now to FIGS. 3, 4 and 18, the processing flow performed by the image display device 100 will be briefly explained. The processing executed by the image display device 100 is substantially the same as the processing flow shown in FIG. 14, or the processing flow shown in FIG. 16 (which is a modification of the processing flow shown in FIG. 14), but differs in that steps U1 to U4 are performed instead of the above-mentioned step S11.

The controller 61 monitors whether or not the finger F has moved into a detection surface by using the distance measurement component 5 (the distance image data shown in FIG. 4) (step U1). This detection surface is defined based on the touch detection plane H1 (without movement of the reflecting element aggregate board 3 or the liquid crystal panel 41) or the touch detection plane H2 (with movement of the reflecting element aggregate board 3 or the liquid crystal panel 41). In particular, after the touch detection plane production component 64 produces the touch detection plane H1 (or H2) corresponding to the optical image E, the touch detection plane production component 64 also produces the detection surface based on the location of the touch detection plane H1 (or H2). Specifically, the detection surface is set at a location spaced apart by a predetermined distance from the touch detection plane H1 (or H2) (optical image E) such that the detection surface is disposed closer to the user (farther from the detector 51) than the touch detection plane H1 (or H2) and is parallel to the the user (farther from the detector 51) than the touch detection plane H1 (or H2) in a manner similar to the relationship between the sensing layer SL1 (corresponding to the touch detection plane H1 (or H2) and the sensing layer SL2 (corresponding to the detection surface) as illustrated in FIG. 17.

If the finger F moves into the detection surface (Yes, in step U1), then the controller 61 uses the touch detection plane H1 (or H2) to confirm whether or not the finger F has moved into the optical image E (step U2). If the finger F moves into the touch detection plane H1 (or H2), which is provided so as to substantially coincide with the optical image E, then the controller 61 detects that the finger F has moved into the optical image E by using the distance measurement component 5 (the distance image data shown in FIG. 4).

If it is determined that the finger F has moved into the optical image E (Yes in step U2), then the controller 61 decides that so far there is no user misperception of the depth direction, so the flow proceeds to the above-mentioned step S12. The processing from step S12 onward is the same as illustrated in FIG. 14 or FIG. 16.

On the other hand, if it is determined that the finger F has not moved into the optical image E, then the controller 61 confirms whether or not the finger F has left the detection surface (step U3). If it is determined that the finger F has not left the detection surface (No in step U3), then the controller 61 goes back to step U2 and performs the processing from step U2 onward. If it is determined that the finger F has left the detection surface (Yes in step U3), then the controller 61 determines that the user is misperceiving the depth direction, and notifies the user of inadequate insertion of the finger F (error notification) (step U4). This notification can involve the use of the optical image E, or in some cases can involve the use of audio. When this notification is given, the processing related to input manipulation in one example is temporarily ended, and the system awaits the next input manipulation (step U1).

With the processing as illustrated in FIG. 18 and performed by the image display device 100 illustrated in FIG. 3, once the finger F moves in and out with respect to the detection surface (leaving the detection surface without moving into the optical image E), it is determined that the user is misperceiving the depth direction. This, however, is just one example. Specifically, the configuration can be such that if the movement of the finger F in and out with respect to the detection surface is repeated for at least a specific number of times, it is determined that the user is misperceiving the depth direction.

Specifically, FIG. 19 is a flowchart of part of the processing flow in accordance with a modification example of the processing as illustrated in FIG. 18 and performed by the image display device 100 illustrated in FIG. 3. With the processing flow illustrated in FIG. 18, if it is determined that the finger F has left the detection surface (Yes in step U3), then the controller 61 determines that the user is misperceiving the depth direction, and notifies the user of inadequate insertion of the finger F (error notification) (step U4). On the other hand, with the processing flow illustrated in FIG. 19, if it is determined that the finger F has left the detection surface (Yes in step U3), then the controller 61 determines whether or not the movement of the finger F in and out with respect to the detection surface has been repeated for at least a specific number of times (step U5). If the controller 61 determines that the movement of the finger F in and out with respect to the detection surface has been repeated for a number of times less than the specific number of times (No in step U5), then the process returns to step U1. On the other hand, if the controller 61 determines that the movement of the finger F in and out with respect to the detection surface has been repeated for the specific number of times (Yes in step U5), then the process proceeds to step U4, and the controller 61 notifies the user of inadequate insertion of the finger F (error notification) (step U4).

The processing flow as illustrated in FIGS. 18 and 19 can also be performed by the image display device 200 illustrated in FIG. 7 or by the image display device 300 illustrated in FIG. 9 in the same manner as performed by the image display device 100 illustrated in FIG. 3. In view of the similarity between the configuration of the image display device 100 and the configurations of the image display device 200 and 300, the detailed descriptions of the processing flow performed by the image display device 200 or 300 will be omitted for the sake of brevity.

Also, in the illustrated embodiment, the detection surface is produced relative to the touch detection plane H1 (or H2) based on the distance information obtained by the detector 51. However, of course, the detection surface can be produced in the same manner as explained in the sixth embodiment. In this case, the image display device 100 (200, 300) has the second detector 416 (see FIG. 17) that scan a specific scan range to define the detection surface. Of course, the position of the specific scan range (e.g., the detection surface) is configured to be adjustable according to the position of the the touch detection plane H1 (or H2).

In the illustrated embodiment, the image display device 100 (200, 300) further comprises the detector 51 (e.g., the second detector) or the second detector 416 (e.g., the second detector) configured to detect the movement of the finger F (e.g., the indicator) with respect to the detection surface (e.g., the detection plane) that is set at a position away from the optical image E, the main body-side controller 6 (206, 306) (e.g., the controller) being configured to perform the error notification (step U4) upon determining that an operation in which the the finger F (e.g., the indicator) moves out from the detection surface (e.g., the detection plane) (Yes in step U3) without moving into the optical image E (No in step U2) is performed at least a specific number of times (Yes in step U5) after the finger F (e.g., the indicator) moves into the detection surface (e.g., the detection plane) (Yes in step U1).

In the illustrated embodiments, the input device comprises a first detector that is able to detect the position and movement of an indicator with respect to an image displayed in midair, and a processor that performs input processing based on information detected by the first detector. The processor is configured to determine whether or not to notify the user of an error based on the movement of the indicator, when deviation is detected between the position where the indicator moves into the image, and an input acceptance region included in the image (first configuration).

With the input device in this configuration, if the indicator undergoes a characteristic movement when the position where the indicator moves into the image has deviated from the input acceptance region, the user can be notified of an error. If this characteristic movement is assumed to be a movement that is often performed when the user does not perceive the image properly, then misperception by the user can be corrected.

The first detector is preferably configured to include a light source, an optical scanner for scanning light emitted from the light source, and a light receiver for receiving reflected light produced when the light scanned by the optical scanner is reflected by the indicator. With this configuration, the information obtained from the detector is not complicated, and response can be improved.

With the input device of the first configuration, the configuration can be such that the processor performs the processing to notify the user of an error upon determining that the indicator was pushed in further with respect to the image after the deviation was detected (second configuration). With this configuration, it is possible to correct user misperception of the screen direction with respect to the image.

With the input device of the first or second configuration, the configuration can be such that the processor performs the processing to notify the user of an error upon determining that the indicator has repeatedly moved into a region deviated from the input acceptance region after the deviation was detected (third configuration). With this configuration, it is possible to correct user misperception of the screen direction with respect to the image.

With the input device any of the first to third configurations, the configuration can be such that the processor performs the processing to notify the user of an error upon determining that a state in which the indicator has moved in with respect to the image has continued for at least a specific length of time after the deviation was detected (fourth configuration). With this configuration, in addition to user misperception of the screen direction with respect to the image, it is also possible to correct misperception of the depth direction (a direction perpendicular to the screen).

With the input device any of the first to fourth configurations, the configuration can further comprise a second detector that is able to detect the movement of the indicator with respect to a detection plane that is set at a position away from the image, wherein the processor performs the processing to notify the user of an error upon determining that an operation in which the indicator leaves the detection plane without moving into the image has been performed at least a specific number of times after the indicator moved into the detection plane (fifth configuration). With this configuration, in addition to user misperception of the screen direction with respect to the image, it is also possible to correct misperception of the depth direction (a direction perpendicular to the screen). The specific number of times can be just once, or can be two or more times.

The present invention provides an input device with which input manipulation can be performed smoothly using an image displayed in midair.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of the image display device in an upright position. Accordingly, these directional terms, as utilized to describe the image display device should be interpreted relative to an image display device in an upright position on a horizontal surface.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An image display device comprising:
    an image display component;
    a projection component including an optical element that forms an optical image in midair, the optical image corresponding to an image displayed by the image display component;
    a distance measurement component having a detector that detects an indicator for performing an touch operation relative to the optical image to acquire distance information from the detector to the indicator;
    a main body that supports the image display component, the projection component and the distance measurement component to change a position of the optical image in midair; and
    a controller that determines whether or not the indicator has performed the touch operation relative to the optical image based on the distance information and relative movement information between the distance measurement component and at least one of the image display component and the projection component;
    wherein the image display component and the projection component are relatively movable with respect to each other, and
    the controller determines whether or not the indicator has performed the touch operation relative to the optical image based on the distance information and relative movement information between the image display component and the projection component.

2. The image display device according to claim 1, wherein the image display component is arranged at a predetermined inclination angle with respect to the projection component, and is movable with respect to the projection component while maintaining the predetermined inclination angle, and
    the controller determines whether or not the indicator has performed the touch operation relative to the optical image based on the distance information and movement information of the image display component.

3. The image display device according to claim 1, wherein the projection component is rotatable about a rotational axis, and
    the controller determines whether or not the indicator has performed the touch operation relative to the optical image based on the distance information and rotation information of the projection component.

4. The image display device according to claim 1, wherein the projection component is movable in a first direction, and the controller determines whether or not the indicator has performed the touch operation relative to the optical image based on the distance information and movement information of the projection component.

5. The image display device according to claim 1, wherein the image display component or the projection component is relatively immovable with respect to the distance measurement component.

6. The image display device according to claim 1, wherein the distance measurement component, the image display component and the projection component are integrally movable together.

7. The image display device according to claim 1, wherein the detector includes a light emitter that emits light and a light receiver that receives the light that has been emitted from the light emitter and reflected by the indicator as reflected light, and
the distance measurement component acquires the distance information from the detector to the indicator based on an elapsed time from a time point when the light emitter emits the light until a time point when the light receiver receives the reflected light.

8. The image display device according to claim 1, wherein the detector captures an image to produce a distance image data, and
the controller defines a touch detection plane in the distance image data.

9. The image display device according to claim 1, wherein the controller calculates a touch detection plane based on the relative movement information between the distance measurement component and at least one of the image display component and the projection component, and
the controller determines that the indicator has performed the touch operation relative to the optical image upon determining that the indicator is located in a vicinity of the touch detection plane based on the distance information.

10. The image display device according to claim 1, wherein
the controller determines whether or not to perform an error notification based on movement of the indicator upon detecting deviation between a position of the indicator on the optical image and an input acceptance region of the optical image.

11. The image display device according to claim 10, wherein
the controller detects the deviation between the position of the indicator on the optical image and the input acceptance region of the optical image while the indicator is located in the optical image, and performs the error notification upon determining that the indicator proceeds into the optical image after the deviation between the position of the indicator on the optical image and the input acceptance region of the optical image is detected.

12. The image display device according to claim 10, wherein
the controller performs the error notification upon determining that the indicator repeatedly moves into a region of the optical image that is deviated from the input acceptance region after the deviation is detected.

13. The image display device according to claim 10, wherein
the controller performs the error notification upon determining that the indicator stays in the optical image for at least a specific length of time after the deviation is detected.

14. The image display device according to claim 1, wherein
the projection component receives light of the image displayed by the image display component on one side thereof, and forms the optical image as a virtual touch screen on the other side thereof.

15. The image display device according to claim 5, further comprising
a housing that supports the image display component and the projection component, and
the image display component is movable with respect to the housing.

16. The image display device according to claim 15, wherein
the projection component is fixedly supported by the housing.

17. The image display device according to claim 15, wherein
the projection component is movable with respect to the housing.

18. The image display device according to claim 6, further comprising
a housing that supports the image display component and the projection component, and
the distance measurement component is fixedly supported by the housing.

19. An image display device comprising;
an image display component;
a projection component that forms an optical image corresponding to an image displayed by the image display component;
a distance measurement component having a detector that detects an indicator for performing an touch operation relative to the optical image to acquire distance information from the detector to the indicator;
a controller that determines whether or not the indicator has performed the touch operation relative to the optical image based on the distance information and relative movement information between the distance measurement component and at least one of the image display component and the projection component,
a second detector that detects movement of the indicator with respect to a detection plane that is set at a position away from the optical image,
the controller determining whether or not to perform an error notification based on the movement of the indicator upon detecting deviation between a position of the indicator on the optical image and an input acceptance region of the optical image,
the controller performing the error notification upon determining that an operation in which the indicator moves out from the detection plane without moving into the optical image is performed at least a specific number of times after the indicator moves into the detection plane.

\* \* \* \* \*